(12) United States Patent
Tenbrock

(10) Patent No.: US 7,950,654 B2
(45) Date of Patent: *May 31, 2011

(54) FILM HANDLING SYSTEM WITH ELONGATED FILM GUIDE

(76) Inventor: Michael Tenbrock, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/653,942

(22) Filed: Dec. 19, 2009

(65) Prior Publication Data
US 2010/0127450 A1 May 27, 2010

(51) Int. Cl.
*B65H 9/08* (2006.01)
(52) U.S. Cl. .............. 271/232; 271/5; 271/168; 271/11; 271/90
(58) Field of Classification Search ................... 271/232, 271/1, 5, 123, 168, 11, 20, 90, 104; 355/123; 396/612; 226/76
See application file for complete search history.

(56) References Cited

U.S. PATENT DOCUMENTS

| | | | | |
|---|---|---|---|---|
| 4,328,064 A * | 5/1982 | Miller et al. | | 156/558 |
| 4,502,677 A * | 3/1985 | Senga et al. | | 271/104 |
| 4,540,167 A * | 9/1985 | Tamura et al. | | 271/11 |
| 4,621,800 A * | 11/1986 | Bauer et al. | | 271/11 |
| 5,097,496 A * | 3/1992 | Madate | | 378/173 |
| 5,307,108 A * | 4/1994 | Yamanouchi et al. | | 396/661 |
| 5,967,508 A * | 10/1999 | Olexy | | 271/106 |
| 7,661,672 B2 * | 2/2010 | Tenbrock | | 271/232 |
| 2006/0071395 A1* | 4/2006 | Mizuno | | 271/90 |

* cited by examiner

*Primary Examiner* — Stefanos Karmis
*Assistant Examiner* — Jeremy Severson

(57) ABSTRACT

A film handling system is described, including: a supply container for supporting a plurality of sheets of film; a film receiver; and a transport mechanism for retrieving a sheet of film from the supply container and transporting the sheet of film to the receiving mechanism, said transport mechanism comprising a vacuum head for adhering the sheet of film to the vacuum head; wherein the film receiver comprises a feed mechanism for conveying the sheet of film received by the film receiver, said feed mechanism including a sprocket for mating with at least one of a plurality of sprocket holes in the sheet of film transported by the transport mechanism.

10 Claims, 21 Drawing Sheets

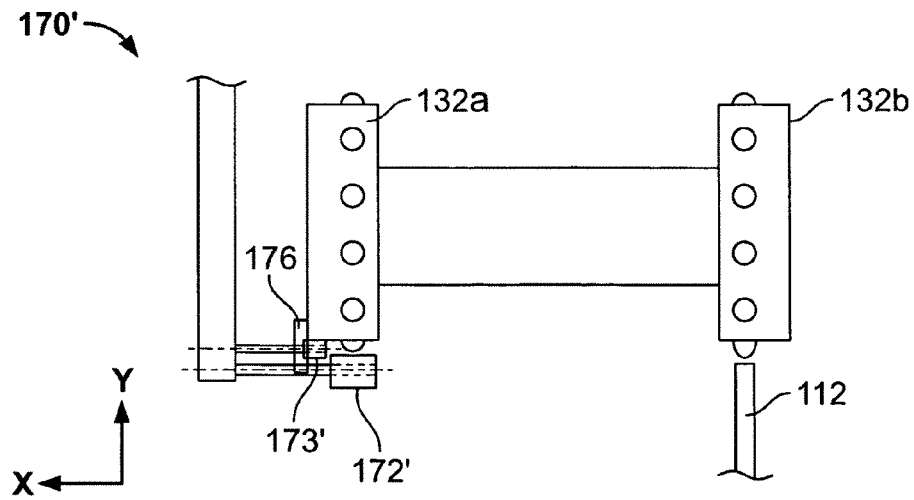
FIG. 4A
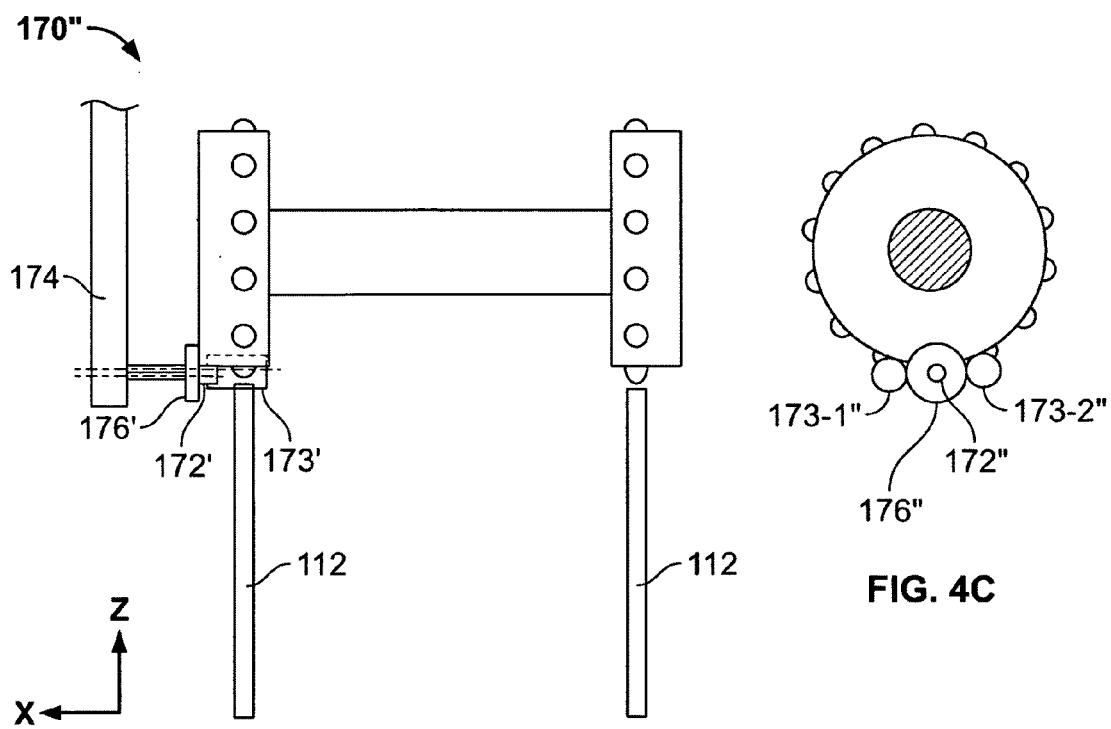
FIG. 4B
FIG. 4C

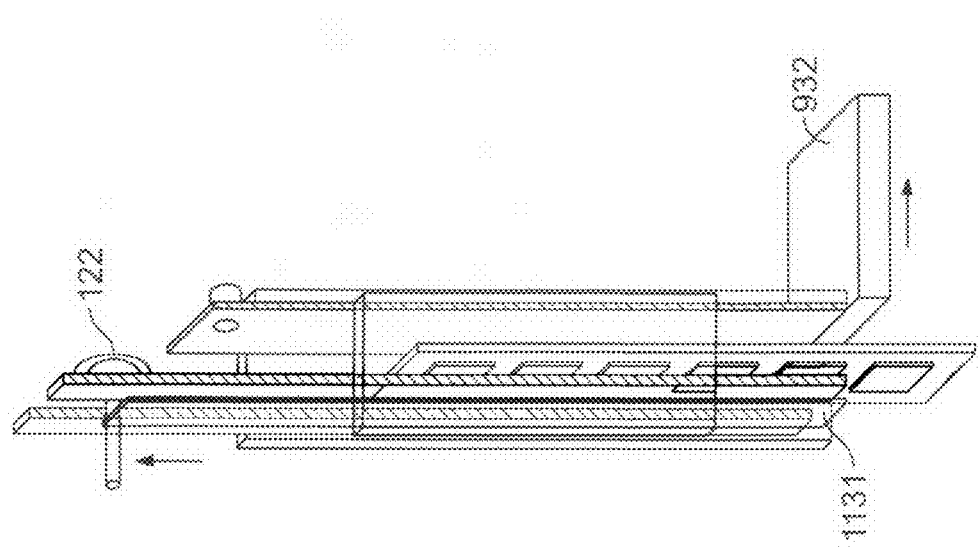
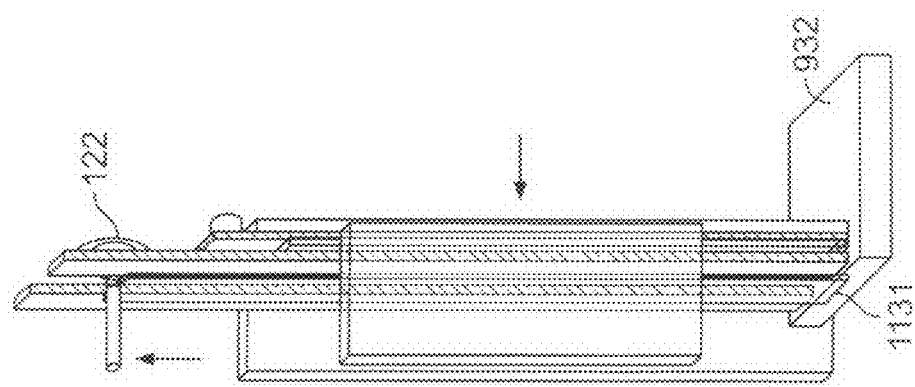
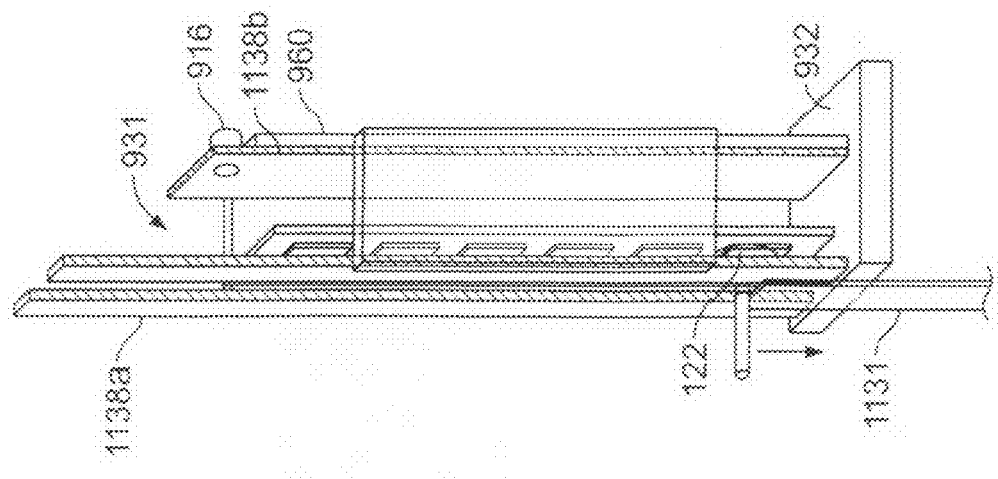

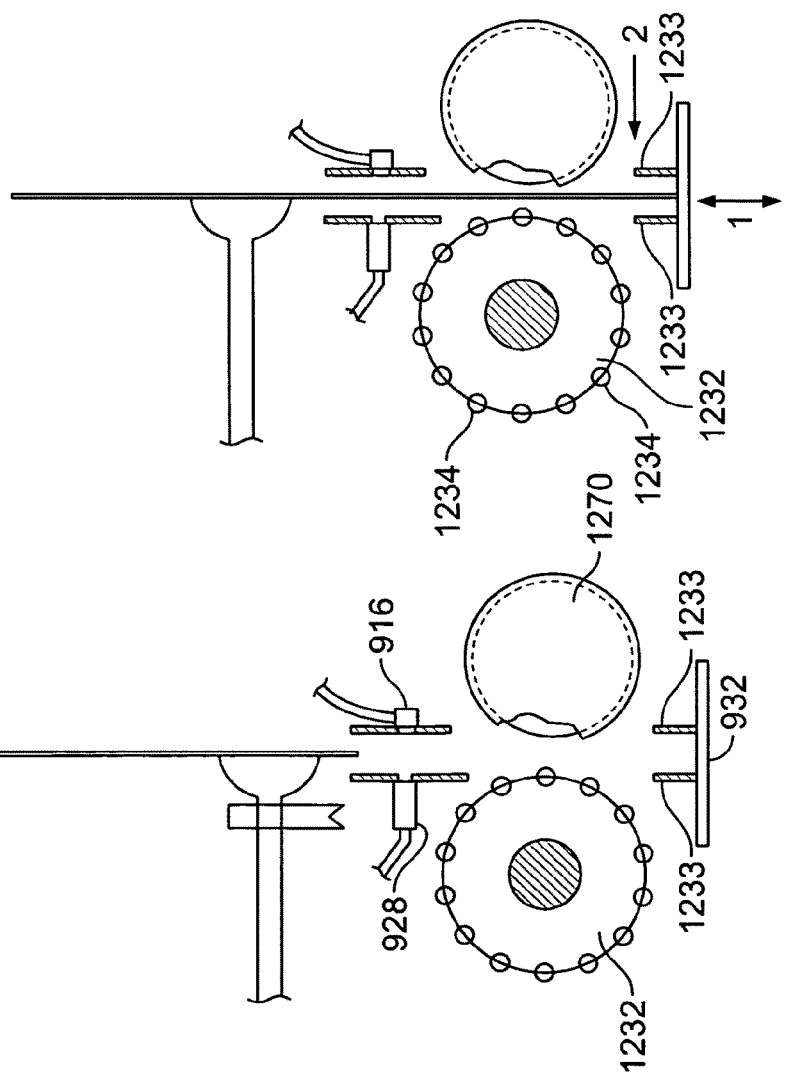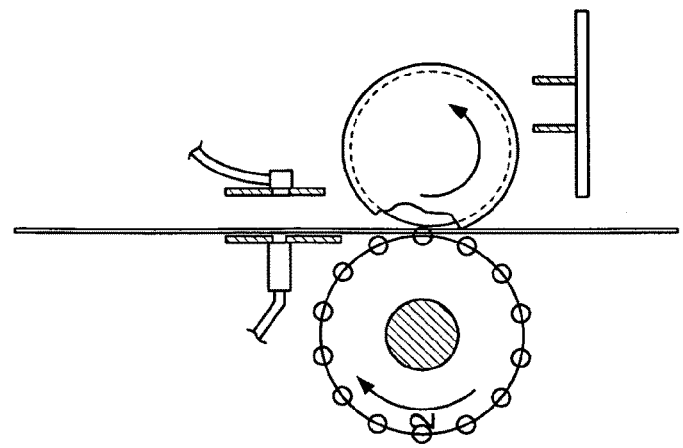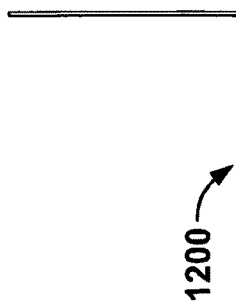

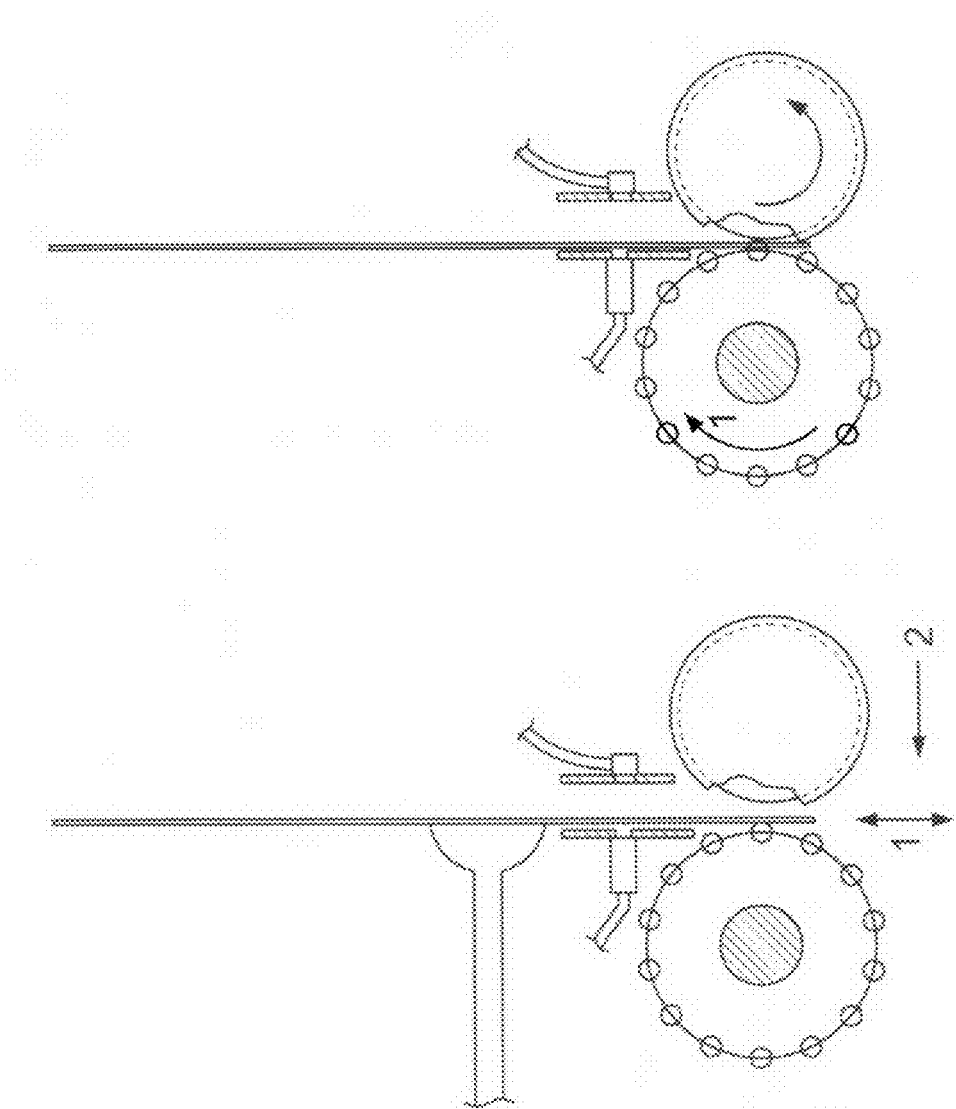

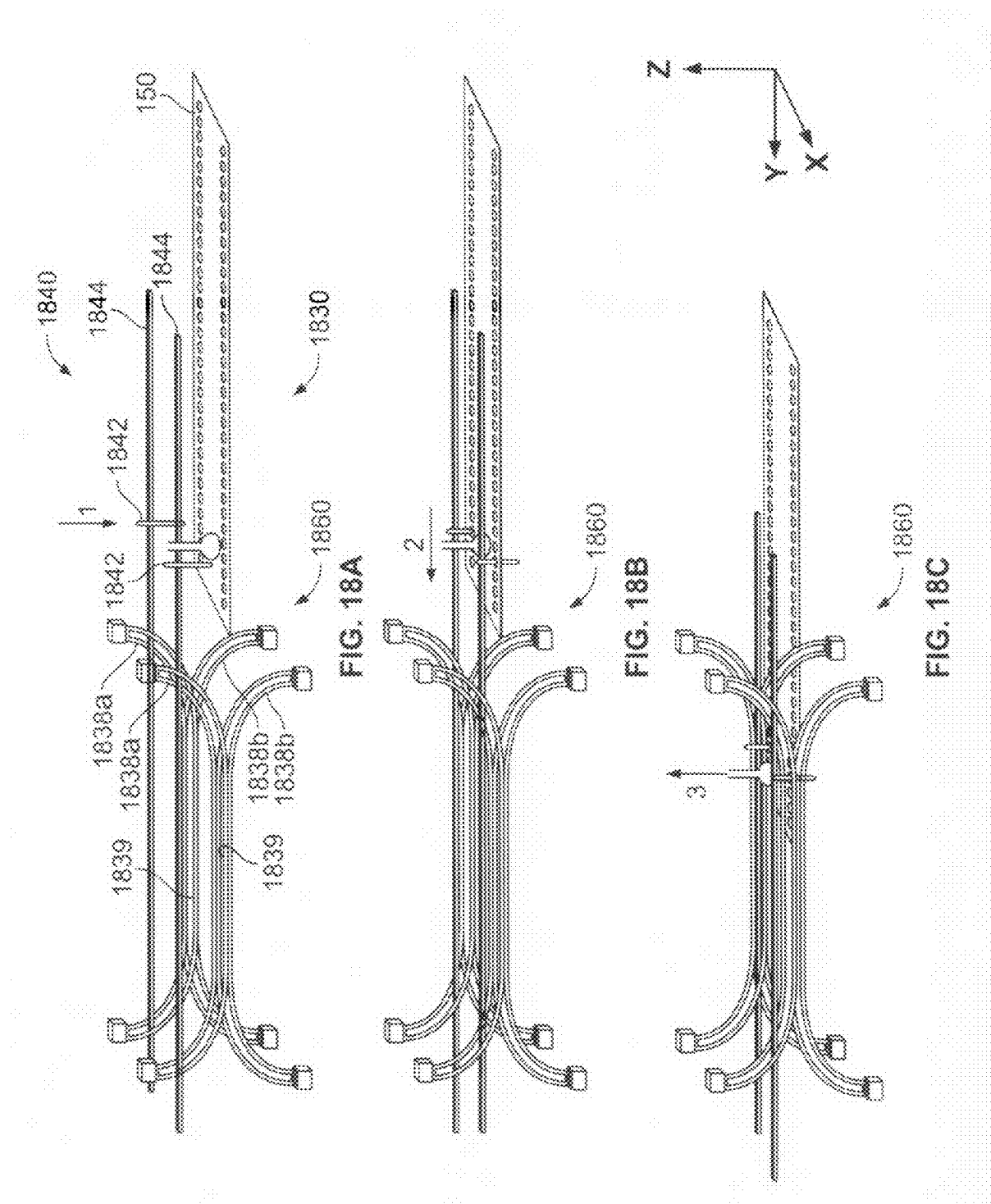

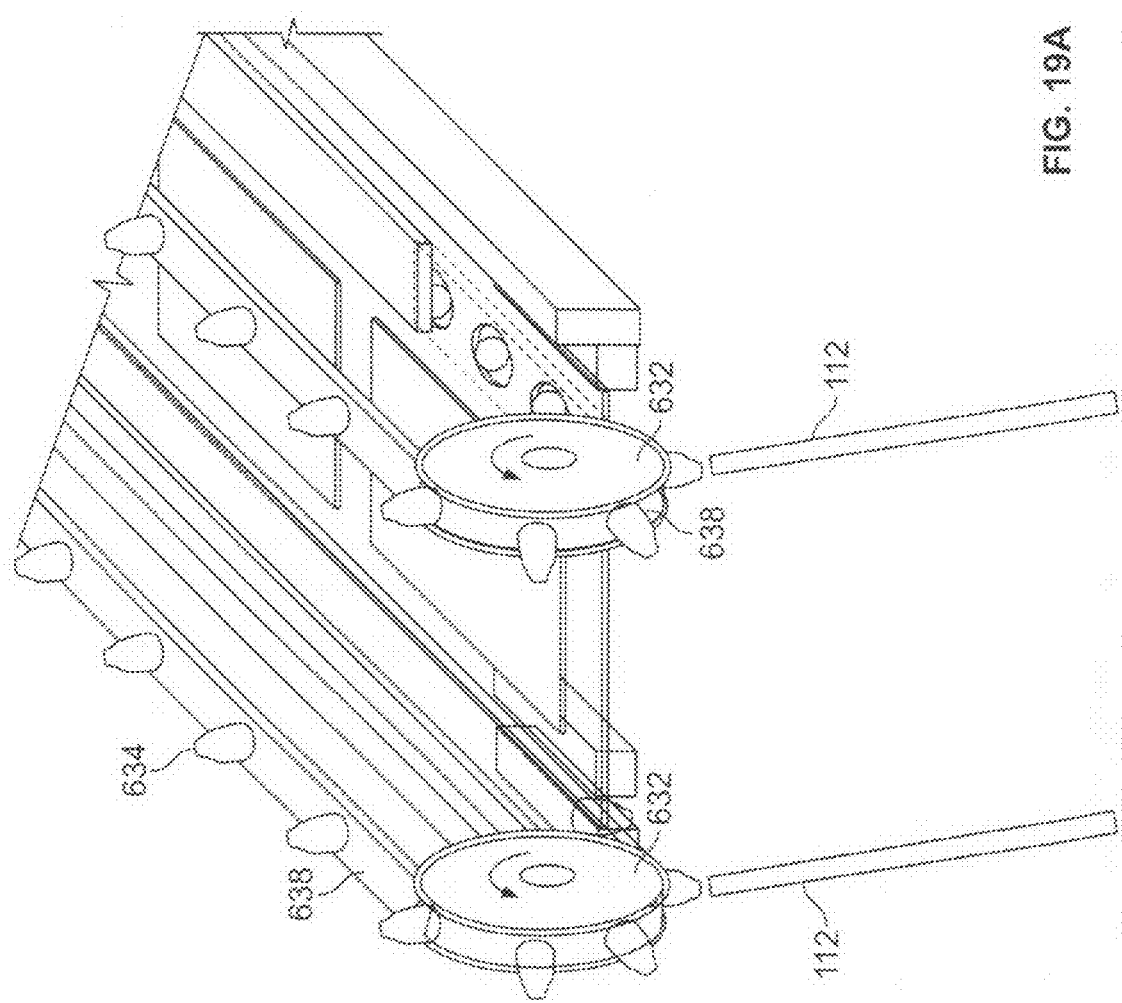

FILM HANDLING SYSTEM WITH ELONGATED FILM GUIDE

CROSS-REFERENCE TO RELATED APPLICATIONS

This application is entitled to the benefit of application Ser. No. 11/413,280 filed Apr. 28, 2006.

BACKGROUND

With the popularity of digital photography and digital image processing, consumers have increasingly desired to transfer photographic images stored on conventional film negatives into electronically stored digital images. Typically, this is accomplished by loading a sheet of processed film into a scanner and scanning the film to produce the digital image. Processed film is normally cut into sheets containing one to six images. Thus, if a user has a large number of negatives to scan, the process of loading each individual sheet of film into the scanner can become overly time-consuming. Accordingly, there is a desire for improved systems and methods for automate the loading and scanning of multiple sheets of film.

Conventional systems for handling the feeding of paper or film documents, such as those used in photocopiers, printing presses, printers and scanners, are not well suited for the handling of film. In particular, the rollers used for feeding individual sheets from a stack of paper or film may damage the image on sheets of film. In addition, these loading mechanisms are configured to load a large number of identically-sized sheets of paper in standard sizes such as 8.5"×11" or 8.5"×14". In contrast, photographic film negatives are often manually cut, resulting in sheets of film of varying lengths that are difficult to accurately load on a bulk basis. In addition, photographic film can change its shape over time or during operation, such as when the film curls around unpredictable angles.

SUMMARY

A film handling system is described, comprising: a supply container for supporting a plurality of sheets of film; a film receiver; and a transport mechanism for retrieving a sheet of film from the supply container and transporting the sheet of film to the receiving mechanism, said transport mechanism comprising a vacuum head for adhering the sheet of film to the vacuum head; wherein the film receiver comprises a feed mechanism for conveying the sheet of film received by the film receiver, said feed mechanism comprising a sprocket for mating with at least one of a plurality of sprocket holes in the sheet of film transported by the transport mechanism.

Another film handling system is described, comprising: a supply container for supporting a plurality of sheets of film, each sheet of film comprising a plurality of sprocket holes, said supply container comprising at least one elongated film guide for insertion into one of the sprocket holes in each sheet of film supported by the supply container; a film receiver; and a transport mechanism for retrieving a sheet of film from the supply container and transporting the sheet of film to the film receiver, said transport mechanism comprising a vacuum head for adhering the sheet of film to the vacuum head.

Another film handling system is described, comprising: a supply container for supporting a plurality of sheets of film in a first orientation, each sheet of film comprising a plurality of sprocket holes; a film receiver; and a transport mechanism for retrieving a sheet of film from the supply container, rotating the sheet of film to a second orientation non-parallel with the first orientation, and transporting the sheet of film to the film receiver, said transport mechanism comprising a vacuum head for adhering the sheet of film to the vacuum head.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DESCRIPTION OF THE DRAWINGS

FIGS. 4A-4C show alternative embodiments of a mating assembly.

FIGS. 11A-11C are perspective views of a batch loading system in accordance with another embodiment of the present invention.

FIGS. 12A-12C are side views of a batch loading system in accordance with another embodiment of the present invention.

FIGS. 13A-13C are side views of a batch loading system in accordance with another embodiment of the present invention.

FIGS. 18A-18C are perspective views of another film receiver assembly, including a flattening mechanism and a feed mechanism.

FIGS. 19A-19B are perspective and front views, respectively, of another flattening mechanism used in conjunction with a pair of upper rollers having a belt passed therebetween.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Figure 1A:
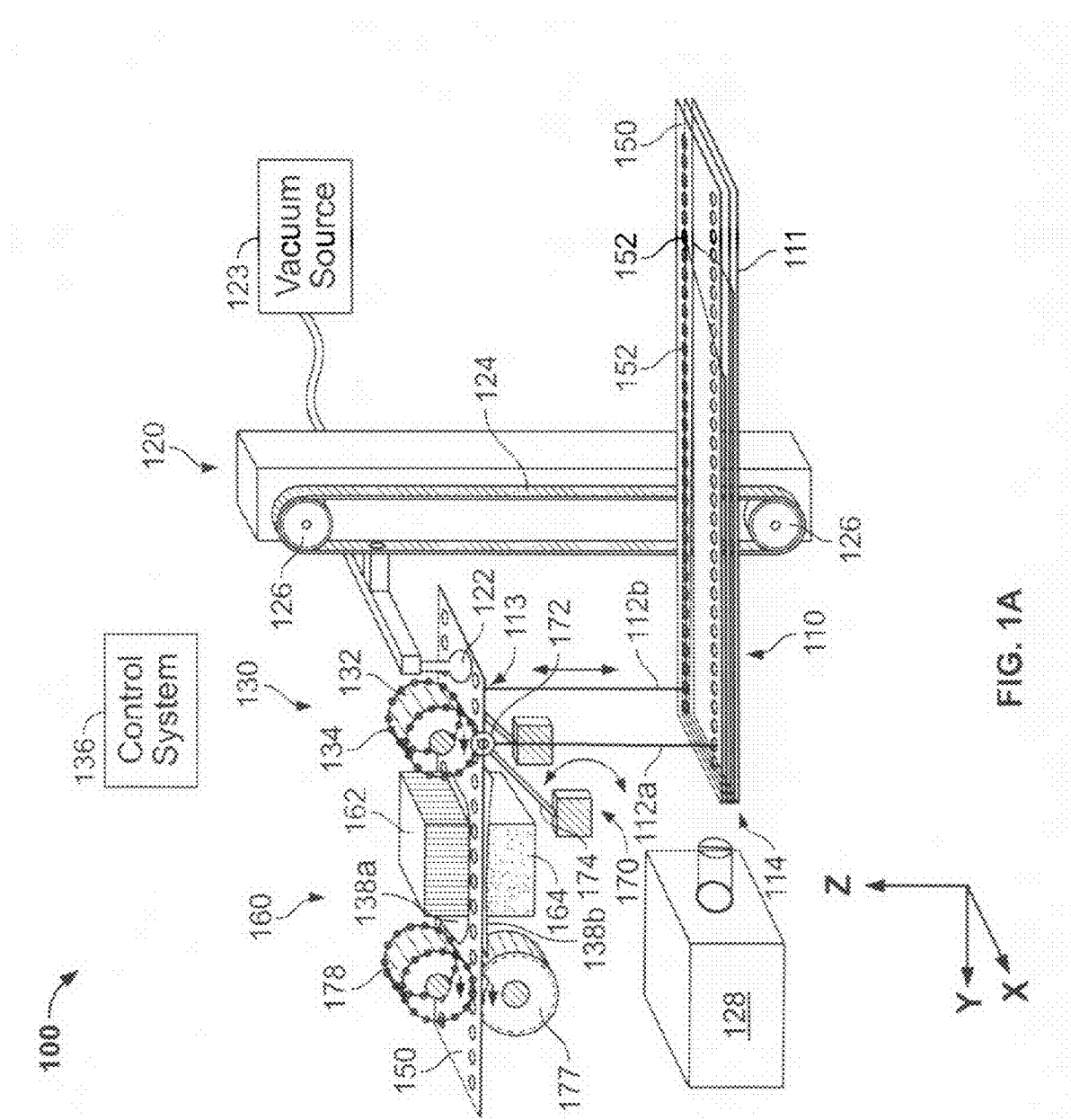
FIG. 1A is a perspective view of a film handling system, in accordance with embodiments of the present invention.
Figure 2:
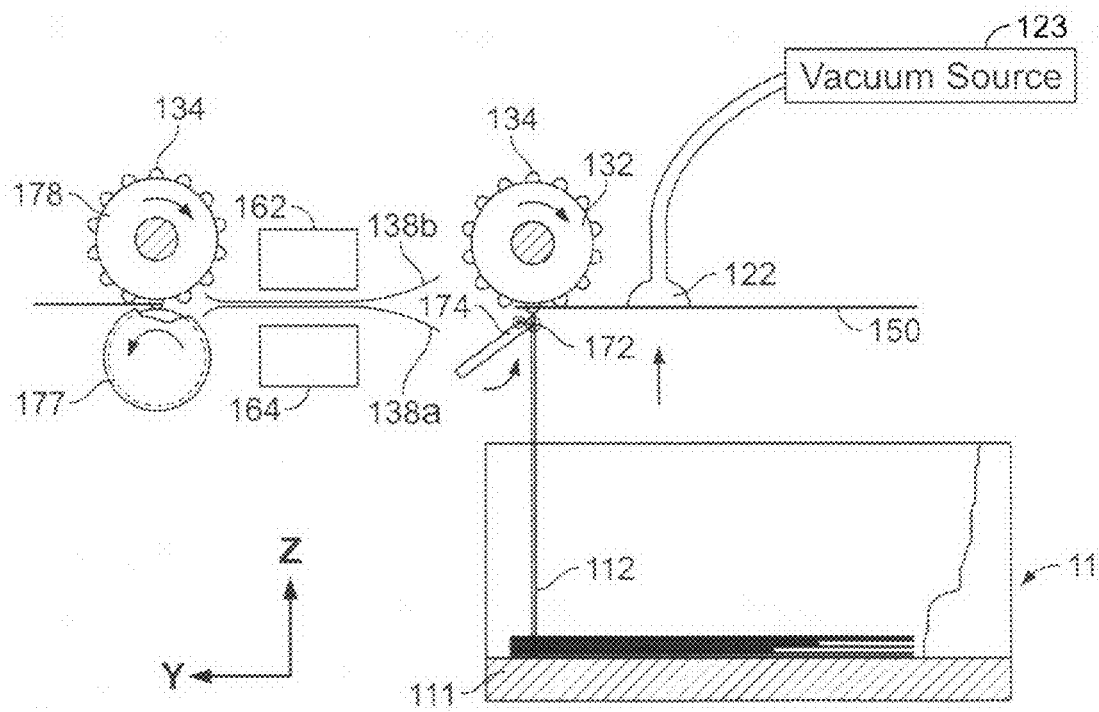
FIG. 2 is a side view of a film handling system, in accordance with embodiments of the present invention.

FIG. 1A is a perspective view of a film handling system 100 which can be used to feed sheets of film 150 from a batch for further processing, and FIG. 2 is a side view of the system 100. This system 100 may be particularly useful for batch loading film for scanning. The film handling system 100 comprises a supply tray 110, a transport mechanism 120, and a film receiver assembly 130.

The supply tray 110 is provided for supporting a stack of film (e.g., processed 35 mm negatives) to be processed. The transport mechanism 120 retrieves a single sheet of film 150 from the stack of film 150 and transports the sheet vertically (in the z-direction) to the film receiver assembly 130. The film receiver assembly 130 receives the sheet of film from the transport mechanism 120 and handles the film 150 for the subsequent processing. In this embodiment, the film receiver assembly 130 translates the sheet horizontally (in the y-direction) along a transport path past a scanning assembly 160, which scans the images on the film 150.

The transport mechanism 120 includes a vacuum head 122 coupled to a vacuum source 123. The vacuum head 122 utilizes a negative air pressure to cause the sheet of film 150 on the top of the stack to adhere to the vacuum head 122. The vacuum head 122 is coupled to a positioning system, which effectuates movement of the vacuum head 122 such that the film 150 adhered to the vacuum head 122 is carried from the stack in the supply tray 110 to the film receiver assembly 130.

In the illustrated embodiment, the positioning system comprises a belt 124 mounted on a pair of pulleys 126. One of the pulleys 126 is coupled to a motor (not shown), which drives rotation of the pulley 126, thereby actuating linear movement of the vacuum head 122 in the z-direction. In other embodiments, the positioning system may be implemented using other mechanisms, such as, e.g., a linear actuator, a rotating actuator, or a set of gears for actuating movement of the vacuum head 122.

When the vacuum head 122 retrieves the top sheet of film 150 from the stack, the next sheet of film 150 below may stick to the top sheet of film 150 being retrieved. To prevent this, an air supply 128 may be used to direct a flow of air against the leading edge of the sheets of film 150 in the supply tray 110. This flow of air helps to separate the sheets of film 150 and prevent multiple sheets from being retrieved simultaneously.

The film receiver assembly 130 comprises a feed mechanism for conveying the sheet of film 150 in the y-direction past the scanning assembly 160 for scanning. In the embodiment illustrated in FIG. 1, the feed mechanism comprises a roller 132 having a plurality of sprockets 134 positioned across the surface of the roller 132 so as to correspond to sprocket holes 152 in the film 150.

Film is typically produced in standard sizes to ensure that the film will work properly with cameras from different manufacturers. "135" (ISO 1007) is a film format commonly used for still photography. 135 film has the same dimensions (35 mm wide) and sprocket hole spacing (16 sprocket holes per 72 mm of film) as 35 mm movie film but is enclosed in a light-tight cassette for ease of loading into the user's camera. The film is removed from the cassette prior to processing. The standard image format is 24×36 mm.

When used for 135-type film, the sprockets 134 are positioned across the circumference of the roller 132 so that as the roller 132 rotates, each sprocket 134 mates with a corresponding sprocket hole 152 in the film 150 so as to cause the film 150 to travel forward in the y-direction.

As the film 150 travels past the scanning assembly 160, the images on the film 150 are scanned by the scanning assembly 160. This can be accomplished in a variety of ways. In the illustrated embodiment, the scanning assembly 160 comprises a light source 162 positioned on one side of the film 150 and a scanner 164 positioned opposite the light source 162. In other embodiments, the scanning assembly may be provided in other configurations, such as a flatbed scanner having a light source on the same side as the scanner. A control system 136 controls a motor (e.g., a stepper motor) so as to control the rotation of the rollers 132 for coordinating the scanning of the images. The rollers 132 may rotate so as to position a frame of the film for scanning and then cease rotation temporarily while the scanner 164 scans the image. Alternatively, the rollers 132 may continuously move the film 150 past the scanning assembly 160, which scans the images as the frames pass by.

Figure 1B:
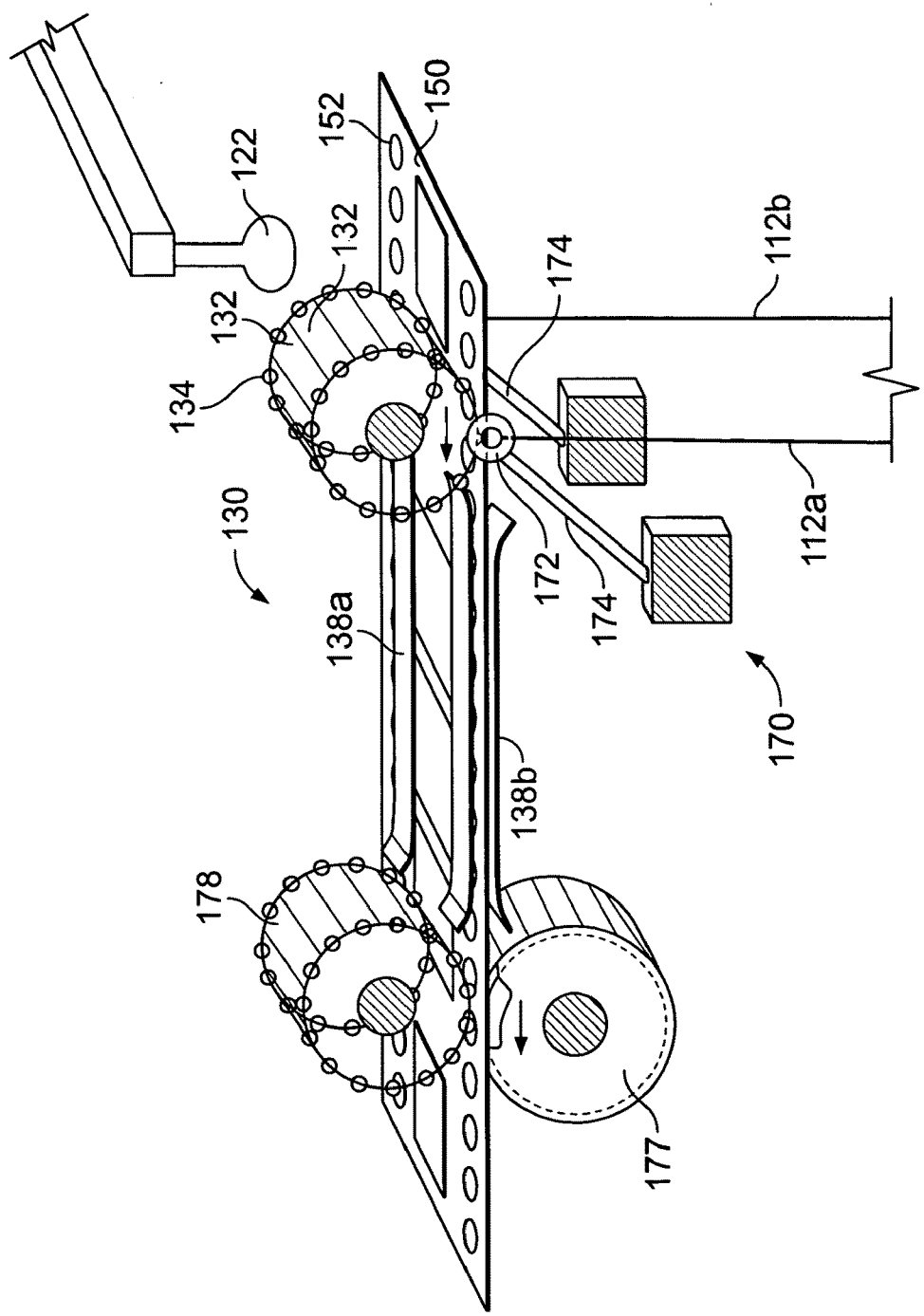
FIG. 1B is an enlarged view of a portion of the film handling system shown in FIG. 1A.

FIG. 1B is an enlarged view of a portion of the film handling system shown in FIG. 1A. As can be seen in FIG. 1B, an upper pair of guides 138a and a lower pair of guides 138b may be provided to position the film 150 along a transport path in the z-direction as the film 150 is transported past the scanning assembly 160. The guides 138a-138b may have a decreasing separation distance, with leading edges that are separated by a greater distance than a center portion of the guides 138a-138b. The larger separation distance along the leading edges of the guides 138a-138b allows for some variation in the position of the leading edge of the film 150 as the film 150 is transported to the scanning assembly 160. The decreasing separation distance reduces vertical movement of the film 150 to ensure that the film 150 is properly positioned in the z-direction, despite any unevenness of the film 150 caused by bends or warping. This helps to ensure a proper focus on the film for the scanner 164. As shown in FIG. 1B, the pairs of guide rails 138a-138b cover only a portion of the film 150 in order to minimize the contact area, thereby minimizing the risk of damage to the film 150. Preferably, the guide rails 138a-138b contact only the portions of the film 150 not containing images.

Figure 1C:
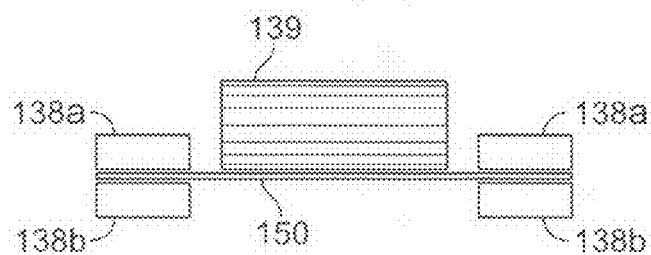
FIG. 1C is a cross-sectional view of a sheet of film positioned between pairs of guide rails.

FIG. 1C is a cross-sectional view of a sheet of film 150 positioned between pairs of guide rails 138a-138b, in accordance with another embodiment of the present invention. In this embodiment, one or more rollers or guides 139 are provided adjacent to the film 150 in order to planarize excessively warped or bent sheets of film 150. The rollers 139 may be slightly separated from the intended path of travel for the film 150 so that if the film 150 is non-planar (e.g., is warped or bent) and extends beyond the expected plane of travel, the rollers 139 will contact the film 150 and retain the film 150 within a predetermined region. However, if the film 150 is sufficiently planar, the rollers 139 will not make contact with the film 150, thereby reducing the likelihood that the rollers 139 might damage the image area of the film 150.

In accordance with embodiments of the present invention, one or more guides may be used to align the sheets of film 150 in the supply tray 110. These guides can help to assure a smooth transition of the film 150 from the transport mechanism 120 to the film receiver assembly 130 by accurately positioning the sprocket holes 152 in the film 150 with the sprockets 134 in the roller 132.

In the embodiment illustrated in FIG. 1A, the supply tray 110 comprises a support 111 and two guide posts 112a-112b. The two guide posts 112a-112b are positioned on the supply tray 110 so that the posts 112 may be received in sprocket holes 152 along opposite edges of the film 150.

Standard 135 film is available in varying lengths to provide varying numbers of exposures. The standard full-length roll typically provides 24-36 exposures. After the film is processed, it is cut into shorter lengths to form sheets of film approximately 5.94" long. However, the length of cut film can vary dramatically, depending on the film processing lab and the length of original film stock.

As a result, when a user is loading a plurality of sheets of film 150 into the supply tray 110, the width of each sheet of film 150 would be the same, according to the ISO standard, but the lengths of each sheet may vary slightly or significantly. Thus, when loading the film 150 into the supply tray 110, it may be desirable to align all of the sheets of film 150 along the front edge 114. This ensures that the guide posts 112 pass through each sheet of film 150. By passing the guide posts 112 through the sprocket holes 152 in each sheet of film 150, the supply tray 110 can reliably orient and align each sheet of film 150 in the supply tray 110. This also prevents the sheets from shifting during the load process.

As the vacuum head 122 carries each sheet of film 150 upwards in the z-direction, the film 150 travels along the guide posts 112a-112b up to the film receiver assembly 130, thereby preventing the film 150 from shifting out of position during travel. The guide posts 112 have distal ends 113 which may be positioned adjacent to the roller 132 such that a pair of sprockets 134 may be closely aligned with the guide posts 112. This allows the sprocket holes 152 in the film 150 being carried by the vacuum head 122 to maintain alignment with the sprockets 134, while still allowing the roller 132 to roll freely without being impeded by friction between the guide posts 112 and the sprockets 134.

Figure 3:
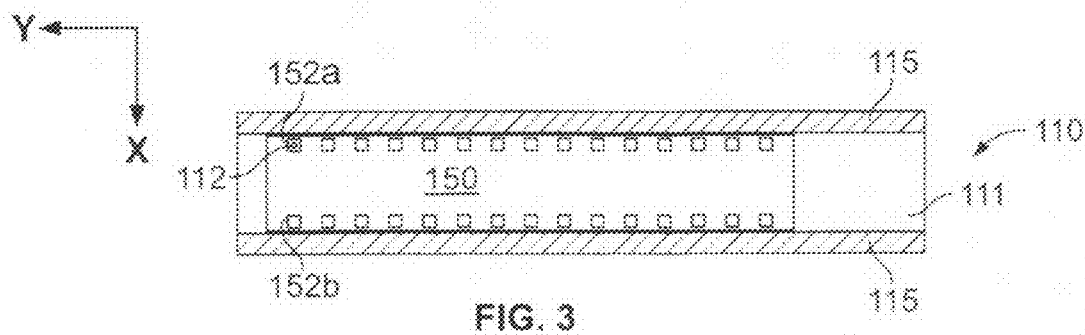
FIG. 3 is a top view of a supply tray, in accordance with another embodiment of the present invention.

FIG. 3 is a top view of a supply tray 110', in accordance with another embodiment of the present invention. In this embodiment, the supply tray 110' includes a single guide post 112 which is passed through a single sprocket hole 152 along one edge of the film 150, and a pair of optional side walls 115 positioned adjacent to opposite edges of the film 150. The single guide post 112 serves to fixedly position the sprocket hole 152a in the x and y directions during storage in the supply tray 110' and transfer by the vacuum head 122. The side walls 115 serve to prevent rotation of the film about that guide post 112, thereby assuring proper alignment of the film 150 and fixing the position of the corresponding sprocket hole 152b along the opposite edge of the film 150 in the x and y directions. This enables the film 150 to be reliably transferred to the roller 132 in the film receiver assembly 130.

In some embodiments, the vacuum head 122 carries the film 150 sufficiently high such that a pair of sprockets 134 in the roller 132 penetrate a pair of sprocket holes 152 in the film. Thus, when the roller 132 begins to rotate, the sprockets 134 will engage the sprocket holes 152 so as to cause the film 150 to be transported in the y-direction. This vertical position may be co-planar with or very close to being co-planar with the x-y plane defined by the transport path.

In other embodiments, a mating assembly 170 may be used to securely clamp the film 150 against the roller 132 so as to ensure proper mating between the sprockets 134 and the sprocket holes 152. In the embodiment illustrated in FIG. 1, the mating assembly 170 comprises a pair of small rollers 172 provided on the distal ends of a pair of lever arms 174. As the film 150 is being raised by the vacuum head 122, the lever arms 174 rotate to position the lever arms 174 and roller 172 out of the path of travel of the film 150. Once the film 150 is positioned adjacent to the roller 132, the lever arms 174 rotate to press the pair of rollers 172 against the back side of the film 150 directly opposite the roller 132 and adjacent the guide posts 112a-112b. This ensures a secure coupling of the sprockets 134 and the sprocket holes 152. In some embodiments, the pair of rollers 172 may be compressible so as to allow the rollers 172 to maintain pressure against the roller 132 despite the uneven surface produced by the sprockets 134. This may be achieved by providing annular collars made of foam or other polymer around the outside of the rollers 172. Once the pair of rollers 172 have securely coupled the sprockets 134 and the sprocket holes 152, the vacuum head 122 can release the film 150, thereby completing the transition of the film from the transport mechanism 120 to the film receiver assembly 130.

FIG. 4A shows an alternative embodiment of a mating assembly 170' which comprises two rollers 172' and 173' which apply pressure on the bottom side of the film 150 so as to facilitate mating of the sprocket holes 152 and the sprockets 134. In this embodiment, the mating assembly 170 is aligned with a first roller 132a and a single guide post 112 is aligned with a second roller 132b along the opposite edge of the film 150. The second roller 173' includes a flange 176 which serves to align the film 150 in the x-direction. FIGS. 4B-4C show an alternative embodiment of a mating assembly 170" which comprises a central roller 172" and a flanking roller 173-1" (and an optional flanking roller 173-2"). The central roller 172" includes a flange 176" for preventing lateral movement in the x-direction. In yet another embodiment, a pair of mating assemblies 170" may be used with a pair of guide posts 112, with support from a pair of lever arms 174. In these embodiments, the vacuum head 122 carries the film 150 sufficiently high such that the sprockets in the roller(s) can penetrate a pair of sprocket holes 152 in the film 150.

Figure 15B:
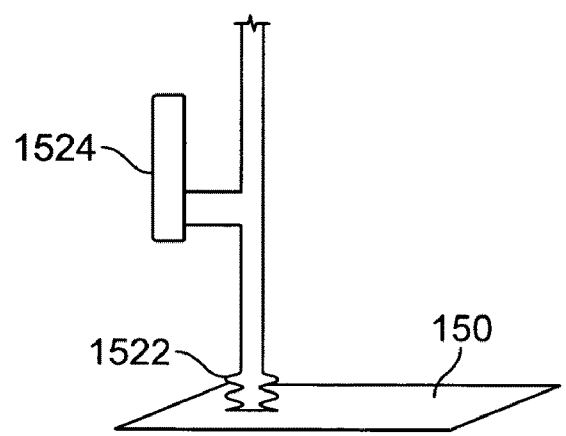
Figure 16A:
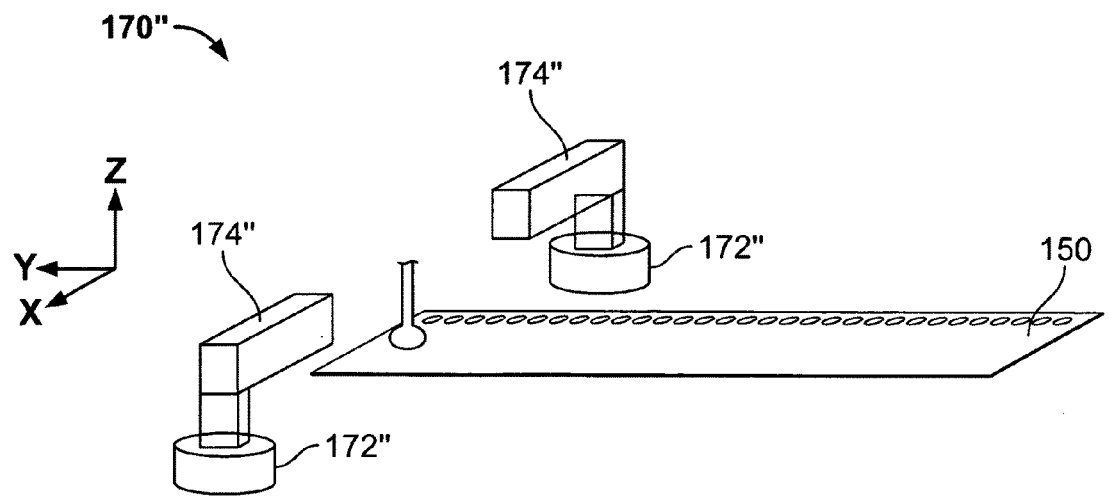
FIGS. 16A-16C show a mating assembly, in accordance with another embodiment of the present invention.
Figure 16B:
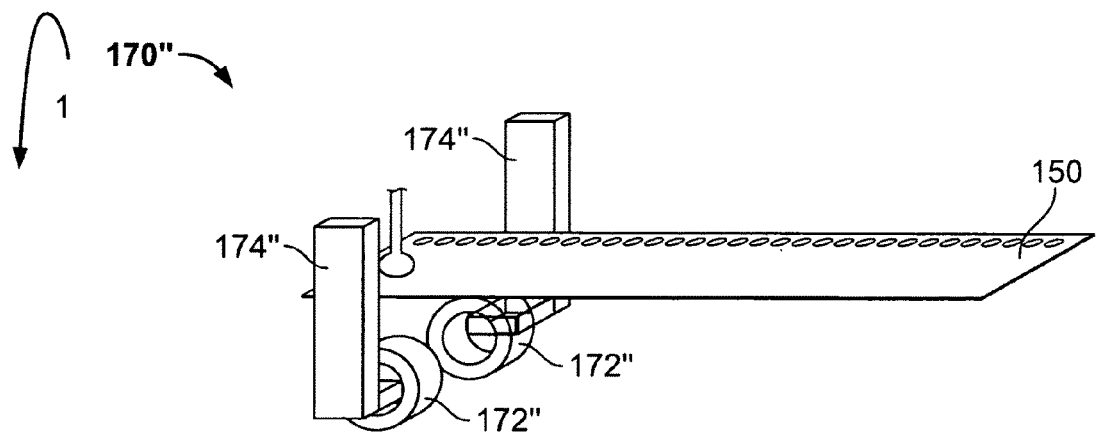
Figure 16C:
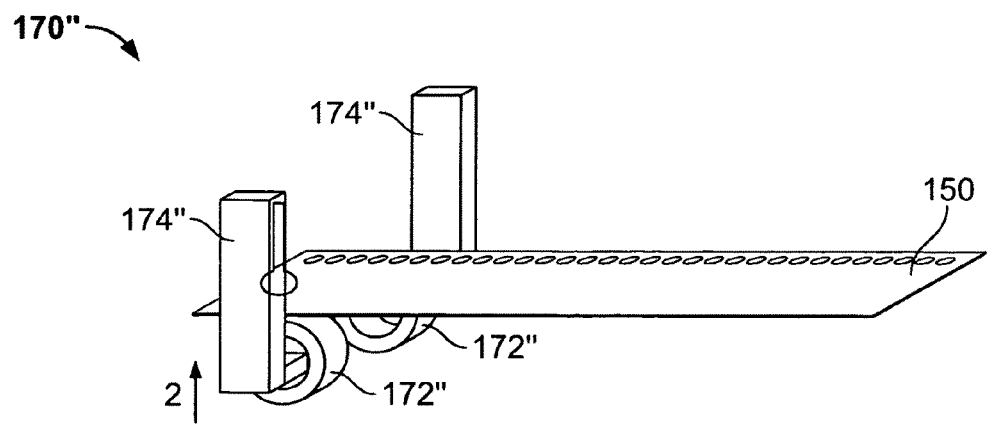

FIGS. 16A-16C show another embodiment of a mating assembly 170" which comprises a pair of rollers 172" which are mounted on a pair of movable arms 174". In this embodiment, the arms 174" are configured to engage the film 150 by first rotating about the y-axis, as shown in FIG. 15B, and then translating upwards in the z-direction to cause the rollers 172" to engage the bottom side of the film 150, thereby applying a pressure onto the film 150. In other embodiments, the arms 174" may move in different directions in order to engage the film 150. These assemblies serve to provide pressure on the region around the sprocket hole without contacting the image region of the film. Other variations are possible.

Referring back to FIG. 2, a second roller 178 having sprockets 134 may be provided after the scanning assembly 160. The rotation of the second roller 178 is coordinated by the control system 136 so as to accurately mate the sprockets 134 with the sprocket holes 152, based on the rotational position of the first roller 132. This synchronization between the first and second rollers 132 and 178 ensures smooth continuous movement of the film 150 after the trailing edge of the film 150 passes the first roller 132. A second mating assembly 177 may be provided to press the film 150 against the second roller 178 to ensure secure mating of the sprockets 134 and sprocket holes 152.

Figure 17:
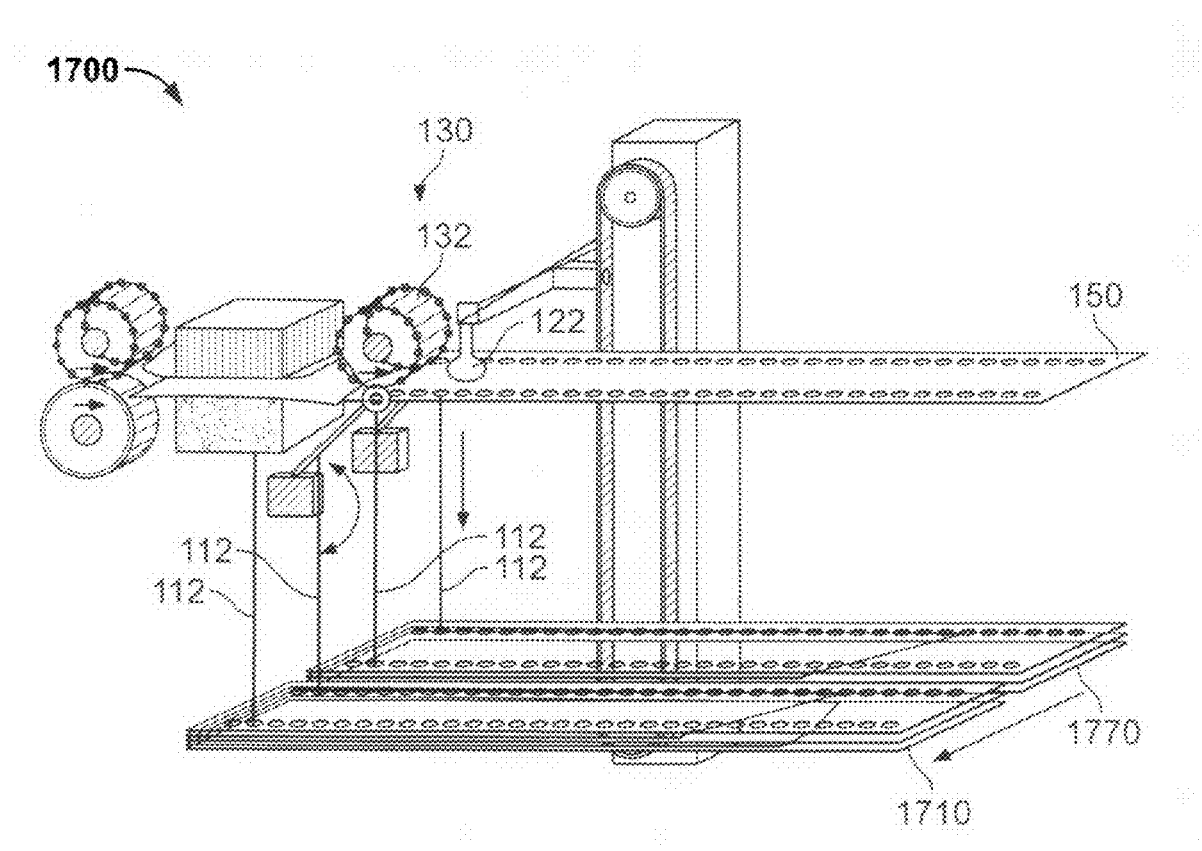
FIG. 17 shows a batch loading system including a supply tray and an output tray.

After scanning, the film 150 may be transported to an output tray for later removal. The output tray might be a simple tray into which the film 150 is dropped after processing. Alternatively, the output may comprise a guided removal mechanism, similar to the feeding mechanism. FIG. 17 shows a batch loading system 1700, including an a supply tray 1710 and an output tray 1770. In this embodiment, the output tray 1770 is positioned adjacent to the supply tray 1710. After the film 150 has been retrieved from the supply tray 1710, the output tray 1770 is positioned under the sprocket wheel 132 so that the sprocket meets the distal ends of the guide posts 112 of the output tray 1770 and the film 150 may be moved with the vacuum head 122 downward. Alternatively, the film 150 may be moved so far out of the film receiver assembly 130 that the film 150 will drop into the output tray 1770. It may be desirable to position separator strips between batches of film in the supply tray 1710 to facilitate easier resorting of the film 150 after processing.

Figure 5A:
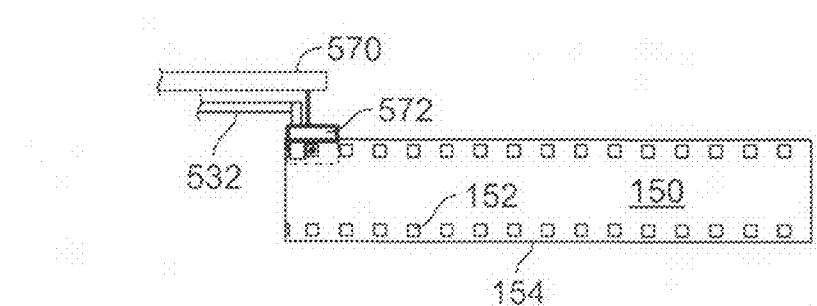
FIGS. 5A-5C show a film handling system in accordance with another embodiment of the present invention.
Figure 5B:
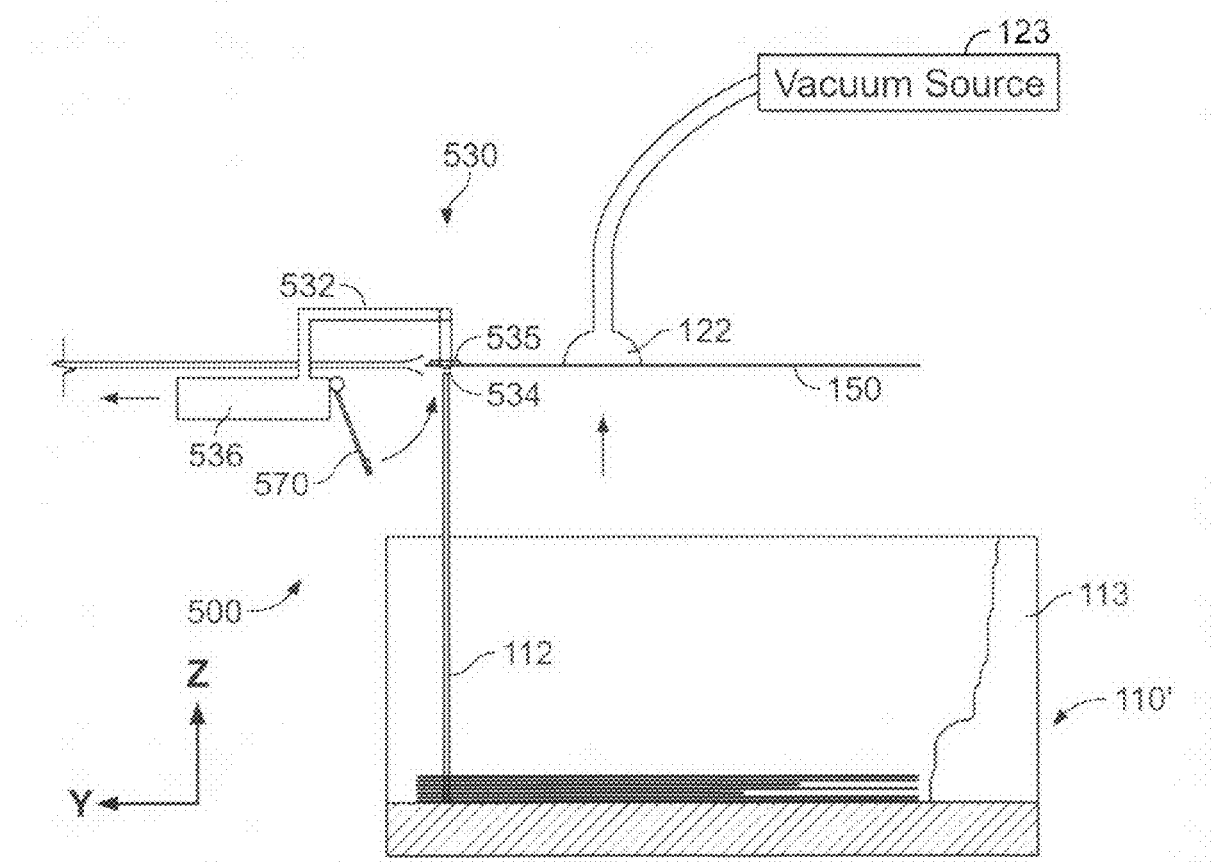
Figure 5C:
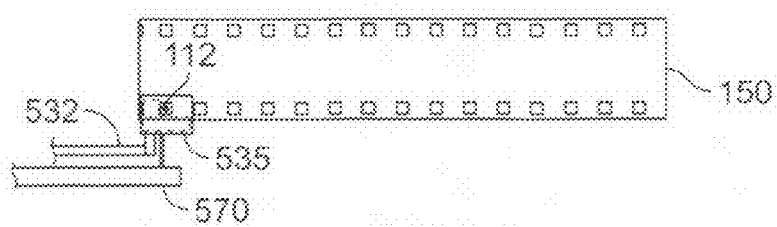

FIGS. 5A-5C show another embodiment of the present invention. This batch film loading system 500 includes a film receiver assembly 530 which utilizes a sprocket 534 mounted on a movable arm 532. The system 500 includes a supply tray 110' having a single guide post 112 and side walls 115, similar to that shown in FIG. 3. FIG. 5A is a plan view of the underside of the film 150 as the film 150 is being received by the film receiver assembly 530. FIG. 5B is a side view of the system 500. FIG. 5C is a top view of the supply tray 110'.

As with the system 100, a vacuum head 122 raises a single sheet of film 150 from the stack of film 150 in the supply tray 110' to approximately the level of the transport path for the film receiver assembly 530. Instead of utilizing a roller 132 having multiple sprockets 134 along its outer circumference, the film receiver assembly 530 utilizes a sprocket 534 mounted on an arm 532. The arm 532, in turn, is mounted on a base 536 which moves linearly to transport the film 150 along the transport path in the y-direction past the scanning assembly 160. A linear actuator, motor-driven belt, or other mechanism may be used to actuate the linear movement of the base 536. In contrast with a stationary but rotating roller 132, which includes a plurality of sprockets 534 that sequentially engage sprocket holes 152 in the film 150, the film receiver assembly 530 utilizes a single sprocket 534 which maintains engagement with a single sprocket hole 152 in the film 150 as the film 150 is transported. Movement of the film 150 along the transport path is effectuated by linearly translating this sprocket 534.

Other variations are possible. For example, in other embodiments, multiple sprockets 534 may be provided on the end of the arm 532 to provide a more secure connection with the film 150. In other embodiments, multiple arms 532 may be used. For example, a second arm 532 comprising one or more sprockets 532 may engage one or more sprocket holes 152 along the opposite edge of the film 150. In yet other embodiments, rollers or other guides may be used to maintain the flatness of the film 150 as the film 150 travels along the transport path. A pair of rollers or guides may be placed on either side of the film 150 to apply a compressive force onto the film 150. If the rollers or guides are positioned along the path of travel of the film receiver assembly 530, the rollers or guides may be configured to be displaced out of the path of the film receiver assembly 530 as the assembly 530 passes the roller or guide.

Various mechanisms may be used to maintain a secure engagement between the sprocket 534 and the sprocket hole 152 in the film 150 as the film 150 is transported along the transport path. For example, a mating assembly 570, similar to mating assembly 170 in FIG. 1, may be used to apply pressure to the bottom of the film 150 at a location adjacent to the sprocket 534 and opposite a flange 535 provided at the base of the sprocket 534. The film 150 will then be pressed between the mating assembly 570 and the flange 535 so as the fix the film's position in the z-direction. This counter pressure can help to maintain the engagement between the sprocket 534 and the sprocket hole 152.

In one embodiment, the mating assembly 570 comprises a sprocket flange 572 which is positioned to contact the film 150 at a location between the edge 574 of the film and the sprocket hole 152. In other embodiments, the sprocket flange 572 may cover the region of the film 150 before the sprocket hole 152, directly around the sprocket hole 152, or above the sprocket hole 152, without covering the image region of the film 150. In yet another embodiment, the mating assembly comprises a flange having an aperture corresponding to the sprocket. Thus, when the mating assembly is pressed against the sprocket flange with the film disposed therebetween, the sprocket passes through the sprocket hole in the film and into the aperture of the mating assembly.

Figure 6A:
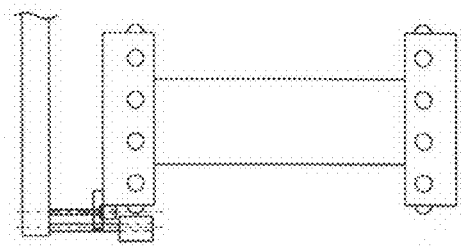
FIGS. 6A-6C show a film handling system in accordance with another embodiment of the present invention.
Figure 6B:
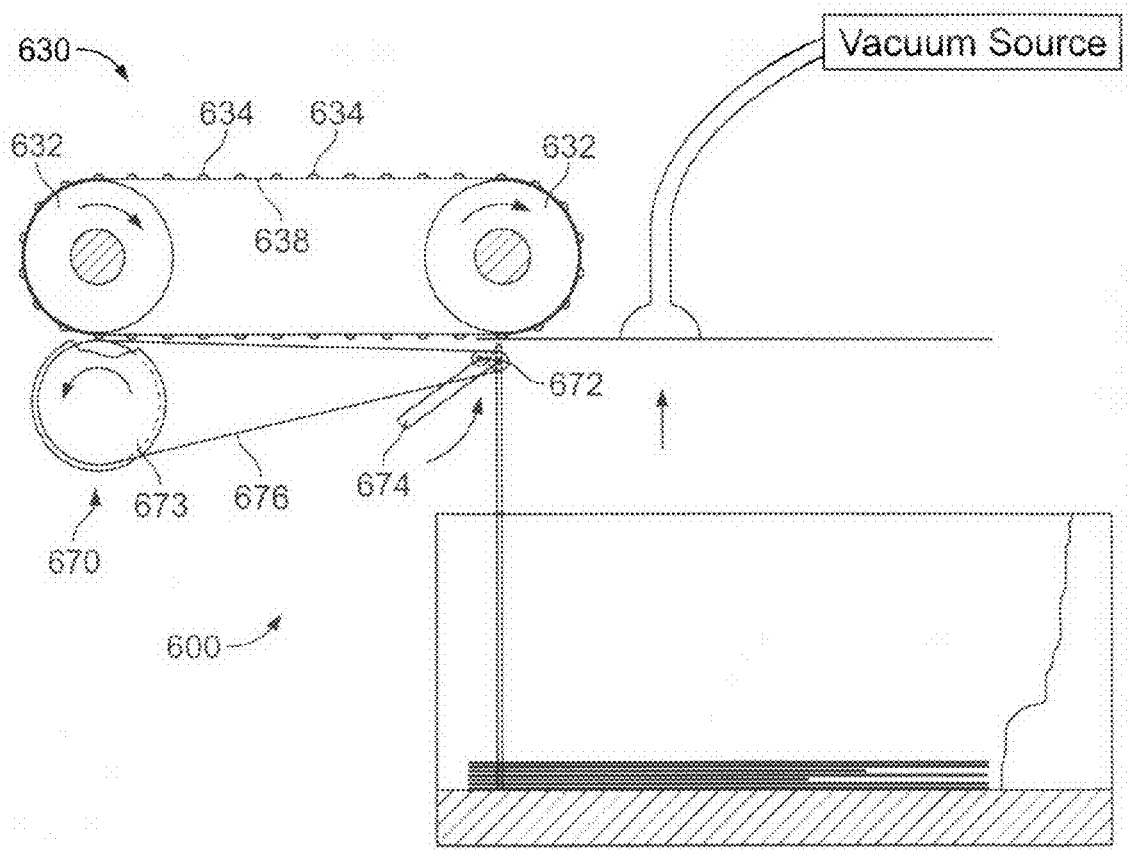
Figure 6C:
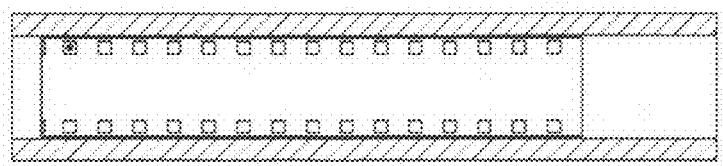

FIGS. 6A-6C show another embodiment of the present invention. This batch film loading system 600 includes a film receiver assembly 630 which utilizes a pair of upper rollers 632 having a belt 638 passed therebetween. The belt 638 includes a single or plurality of sprockets 634 positioned along the length of the belt 638 to correspond with the sprocket holes 152 on the film 150. This arrangement advantageously allows multiple sprockets 634 to be simultaneously engaged with sprocket holes 152 in the film 150 or a higher degree of friction/traction/guidance through the belt as the film 150 is transported along the transport path, thereby assuring a more reliable connection between the film 150 and the film receiver assembly 630.

A mating assembly 670 may also be provided for applying a counter pressure on the bottom side of the film 150. This assembly 670 may comprise a front roller 672, a rear roller 673, and the belt 676 passed therebetween. This belt 676 provides an upward pressure on the film 150 to maintain a secure engagement between the sprockets 634 and the sprocket holes 152 in the film 150. The front roller 672 may be mounted on a movable arm 674 so that the front roller 672 may be positioned out of the vertical path of the film 150 as the vacuum head 122 carries the film up to the film receiver assembly 630.

In yet other embodiments, a second pair of upper rollers 632 and a second belt 638 having sprockets 634 may be provided for engaging the sprocket holes 152 along the opposite edge of the film 150.

Figure 7A:
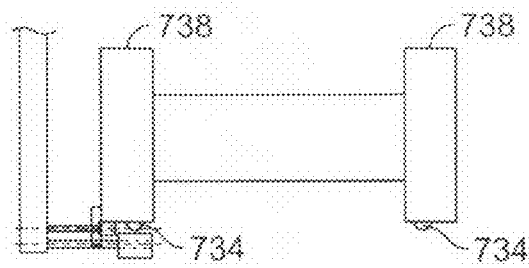
FIGS. 7A-7C show a film handling system in accordance with another embodiment of the present invention.
Figure 7B:
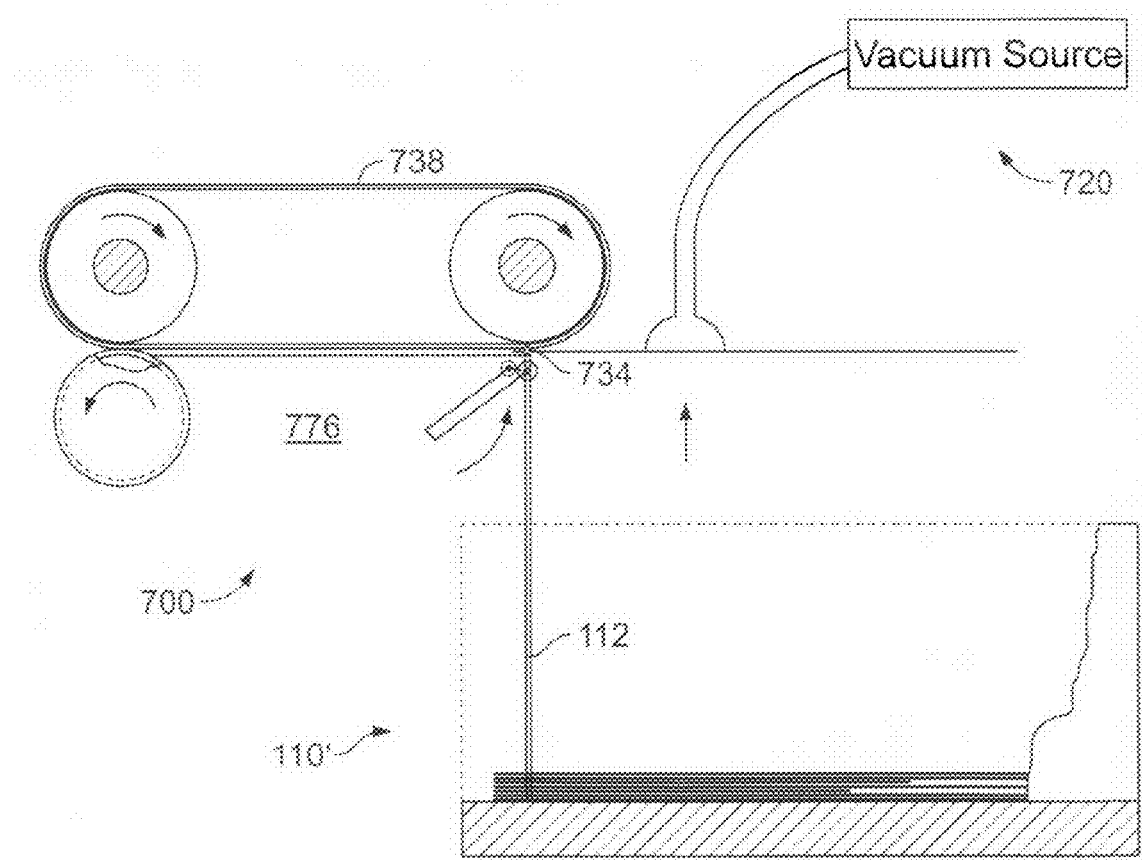
Figure 7C:
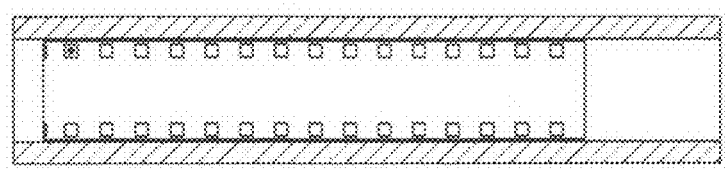

FIGS. 7A-7C show another embodiment of the present invention. This batch film loading system 700 includes a film receiver assembly 730 which also utilizes a pair of upper rollers 732 having a belt 738 passed therebetween. In this embodiment, the belt 738 does not include sprockets. Instead, the surface of the belt 738 maintains a frictional contact with the upper surface of the film 150.

In other embodiments, a single or a plurality of sprocket 734 may be provided on the belt 738. When the film 150 is first received by the film receiver assembly 730 from the transport mechanism 720, the single sprocket 734 is positioned to align with the guide post 112. This single sprocket 734 serves as a reference point for positioning the film 150 as the film 150 is conveyed along the transport path.

In some embodiments, a counter pressure belt 676 may be used for applying a counter pressure along the bottom side of the film 150, as described above with respect to FIGS. 6A-6C. The counter pressure belt 676 may span the entire width of the film 150, or may span only a portion of the width of the film 150, such as the side region of the film adjacent the image region. In other embodiments, one or more counter pressure bars 776 (or rollers) may be used for applying a counter pressure on the film.

Figure 8A:
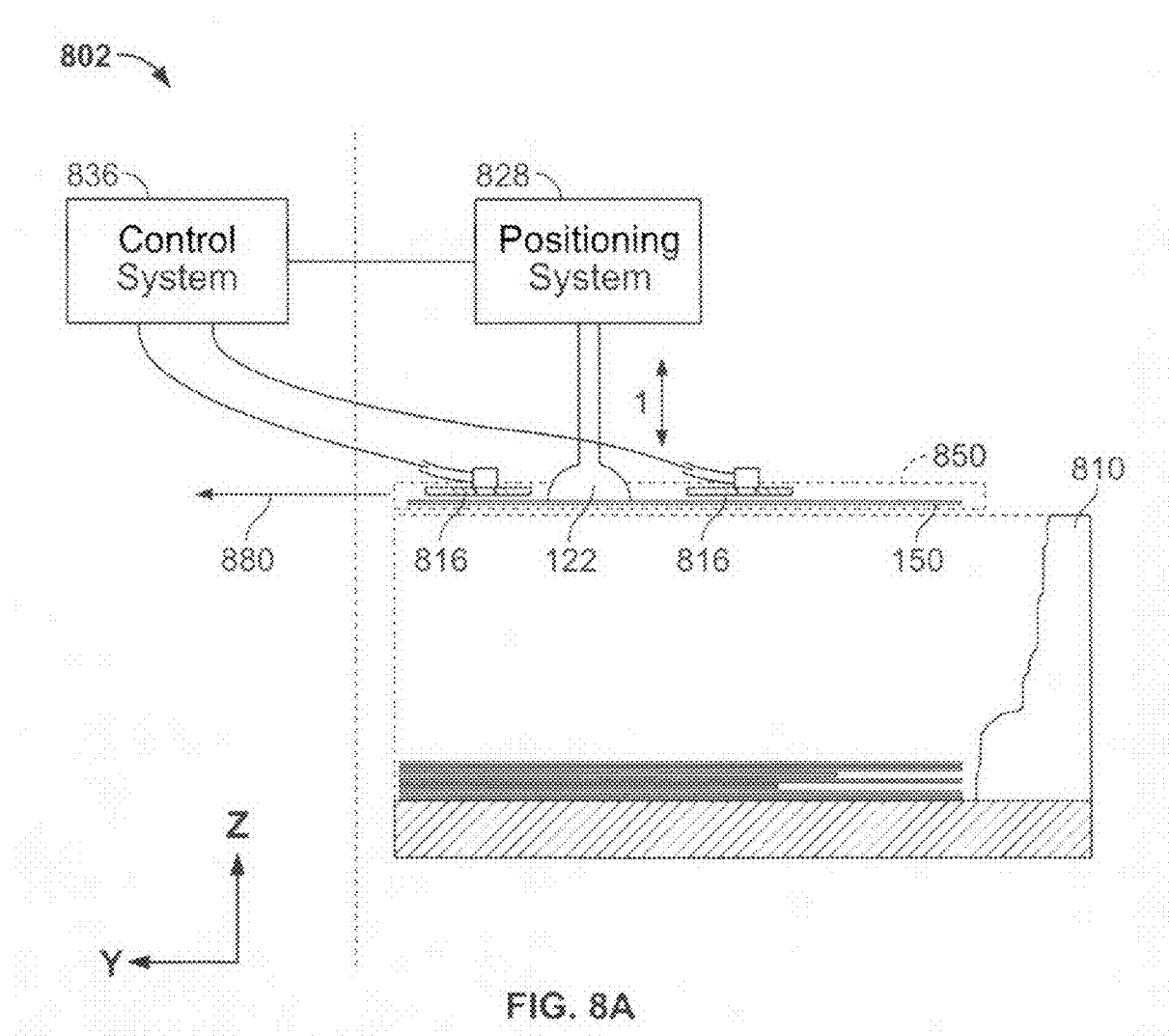
FIG. 8A is a side view of an embodiment of an alignment system for positioning the film without the use of guide posts.

FIG. 8A is a side view of an embodiment of an alignment system 802 for positioning the film 150 without the use of guide posts 112. A pair of optical sensors 816 are provided for detecting the position of the film 150 being transported by the vacuum head 122. In other embodiments, the sensors may use other mechanisms for detecting the position of the film 150, e.g., a mechanical or sonic sensor.

In operation, the positioning system 828 lowers the vacuum head 122 to contact the top sheet in the stack of film 150 in the supply tray 810, as described above with respect to FIG. 1. The negative pressure in the vacuum head 122 causes the sheet of film 150 to adhere to the vacuum head 122. The positioning system 828 then raises the vacuum head 122, causing the sheet of film 150 to raise to approximately the plane of the transport path 880 for subsequent processing (e.g., scanning).

The sensors 816 are used to detect the position of a known reference point in the film 150. For example, the sensors 816 may detect the location of the sprocket holes 152 or may detect one or more edges of the film 150. Based on the signals from the sensors 816, a control system 836 will cause the positioning system 828 to adjust the position of the film 150 to position the reference point at the desired location. This repositioning may occur in the y-direction, the x-direction, or both.

Figure 8B:
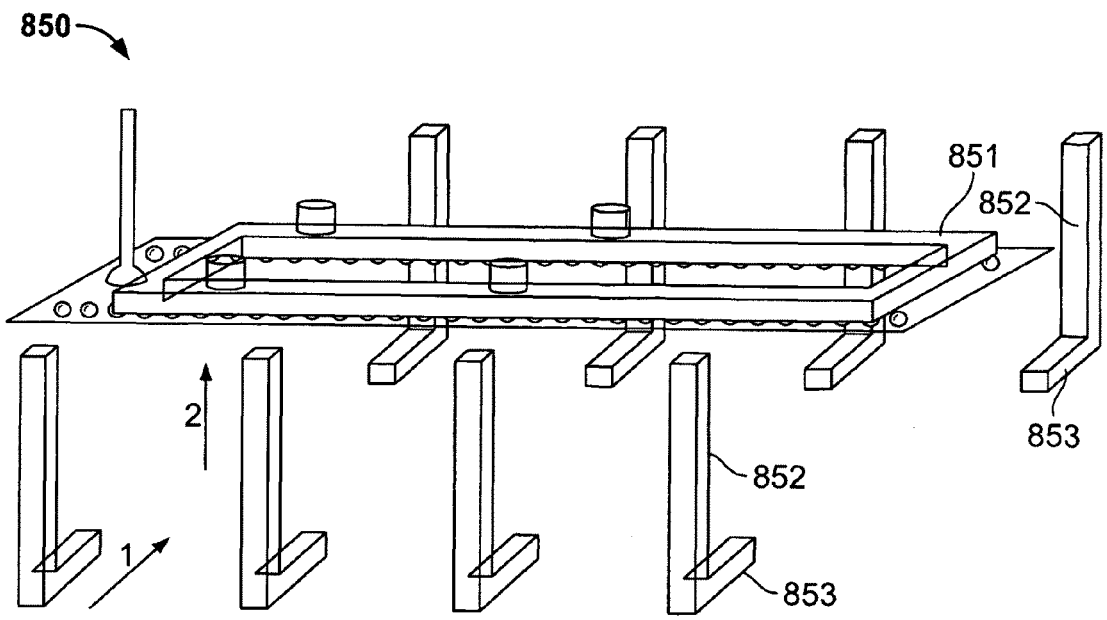
FIGS. 8B-8C are perspective views of a flattening mechanism.
Figure 8C:
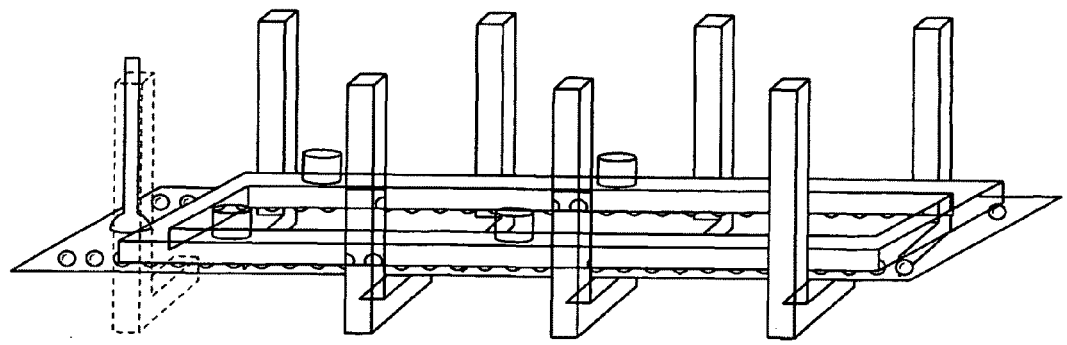

FIGS. 8B-8C are perspective views of a flattening mechanism 850 which may be provided for maintaining the film 150 in a planar shape as the film 150 is transported along the transport path. The flattening mechanism 850 includes a planar upper support frame 851 and a plurality of flattening members 853. These flattening members 853 are mounted on movable arms 852, which can position the flattening members 853 underneath the support frame 851. The flattening members 853 are then pressed against the bottom side of the film 150 to press the film against the planar support frame 851, thereby flattening the film 150.

As described above, it is desirable for the transport mechanism to be able to repeatedly position each sheet of film in a known location and orientation before transferring the film to the film receiver assembly for further processing. In the above-described embodiments, sprockets, guide posts, and/or sensors may be used to ensure that the film is properly positioned for further processing. In accordance with other embodiments of the present invention, gravity is utilized to ensure that each sheet of film is properly positioned.

Figure 9:
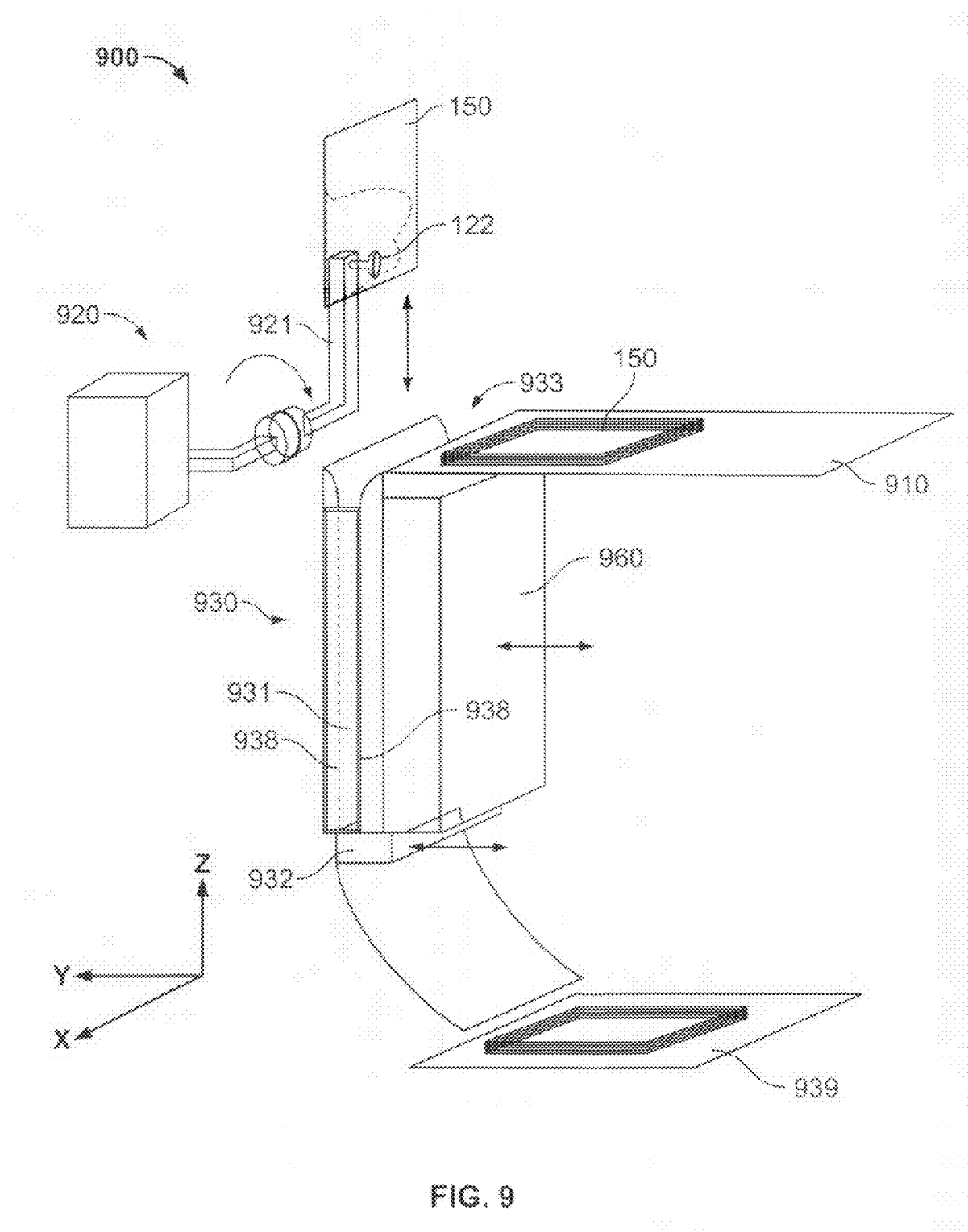
FIG. 9 is a perspective view of a batch loading system in accordance with another embodiment of the present invention.

FIG. 9 is a perspective view of a batch loading system 900 which retrieves a sheet of film from a supply tray and rotates the film into a substantially vertical orientation for transfer to a film receiver assembly 930. The supply tray 910 comprises a platform supporting a stack of film 150 in a substantially horizontal orientation. The transport mechanism 920 comprises a vacuum head 122 disposed at the distal end of a rotatable arm 921. The film receiver assembly 930 comprises a support platform 932 and a pair of sidewalls 938 which define a bay 931 therein. A tapered opening 933 is provided at the top of the bay 931 for receiving the film 150.

The operation of the system 900 is as follows. The stack of film 150 in the supply tray 910 may or may not include guide posts and/or sidewalls for aligning the film 150 in the tray 910. The leading edges of the film 150 in the stack should be within reach of the transport mechanism 920, but need not be precisely aligned. The arm 921 rotates to lower the vacuum head 122 onto the top sheet of film 150, and the negative pressure in the vacuum head 122 causes the top sheet of film 150 to adhere to the vacuum head 122. The arm 921 then rotates so as to lift the top sheet of film 150 off of the stack and into a substantially vertical orientation, as shown in FIG. 9.

In some embodiments, the transport mechanism 920 may be configured to then translate the z-direction so as to lower the leading edge of the film 150 to be closer to or positioned within the tapered opening 933 of the bay 931. In other embodiments, the film 150 is sufficiently close to the tapered opening 933 so that no vertical translation is necessary.

When the film 150 is in the vertical orientation and is sufficiently close to the opening 933, the negative pressure in the vacuum head 122 is ceased, thereby releasing the film 150 and allowing the film 150 to drop downwards into the bay 931. Gravity will pull the film 150 completely into the bay 931 until the leading edge of the film 150 contacts the support platform 932. The support platform 932 is positioned such that when the leading edge of the film 150 is resting on the support platform 932, the frames in the film are positioned for scanning by the scanning assembly 960. After the film 150 is scanned by the scanning assembly 960, the support platform 932 releases the film 150 (e.g., by sliding out of the way), thereby allowing the film 150 to drop into the output tray 939.

Figures 10A, 10B, 10C:
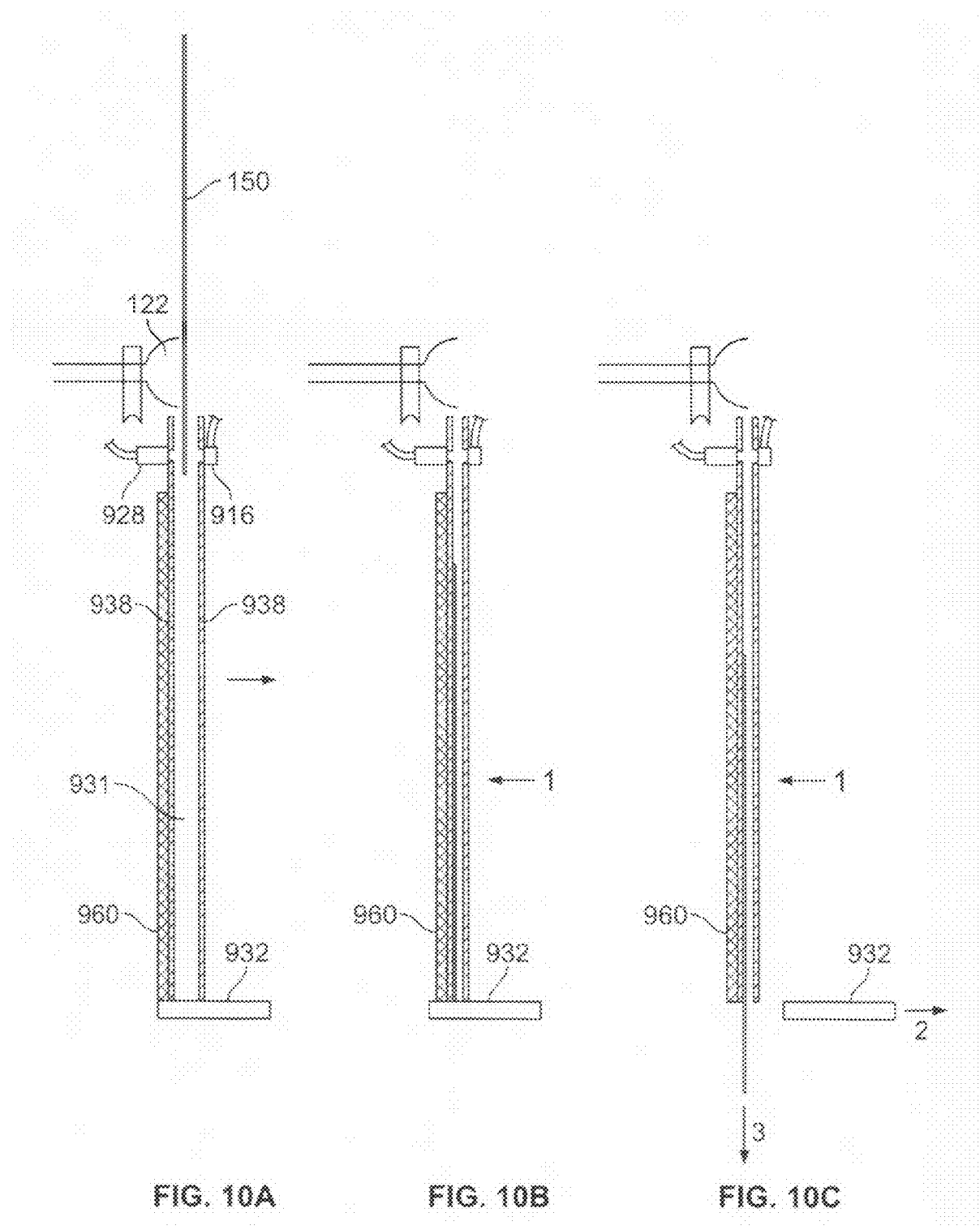
FIGS. 10A-10C are side views of a batch loading system in accordance with another embodiment of the present invention.

FIGS. 10A-10C are side views of a batch loading system 900' similar to the system 900 described above, but with the addition of a sensor 916 for detecting when the film 150 has entered the bay 931. As with the system 900 described above, the system 900' utilizes gravity to draw the film 150 into the bay 931. However, when the vacuum head 122 releases the film 150, it would be desirable to avoid the film 150 from missing the opening 933 of the bay 931, thereby resulting in a misfeed. Misfeeds can be avoided by lowering at least a portion of the leading edge of the film 150 into the bay 931 before releasing the film 150 from the transport mechanism 920. Although the control logic which controls the positioning of the vacuum head 122 should be aware of the position of the vacuum head 122, the position of the leading edge of the film 150 may vary from sheet to sheet, e.g., due to variations in the stacking of film 150 in the supply tray 910.

In order to provide the control logic with information regarding the position of the film 150, a sensor 916 is provided near the top of the bay 931. A light source 928 may also be provided on the side of the film 150 opposite the sensor 916 to provide illumination. In other embodiments, other types of sensors for detecting the position of the film 150 may be used.

In FIG. 10A, the transport mechanism lowers the film 150 into the bay 931. When the sensor 916 detects the presence of a known reference point, the control logic will cause the vacuum head 122 to release the film 150 into the bay 931. The reference point could be, e.g., the leading edge of the film 150, or a sprocket hole 152 in the film 150.

After the film 150 is dropped onto the support platform 932, one or both of the sidewalls 938 may move to narrow the distance between the sidewalls 938, as shown in FIG. 10B. In some embodiments, the sidewalls 938 may press against the film 150 to flatten out any bends or creases in the film 150 so as to provide a substantially planar surface for scanning. After the scanning is completed, the support platform 932 will move out of the way, thereby allowing the film 150 to drop out of the bay 931, as shown in FIG. 10C.

FIGS. 11A-11C are side views of another batch loading system 1100 similar to the batch loading system 900 described above. As shown in FIG. 11A, the vacuum head 122 maintains adhesion with the film 150 as the transport mechanism 920 lowers the film into the bay 931. In order to allow clearance for the vacuum head 122 to maintain adhesion with the film 150, the first sidewall 1138a includes an opening for receiving the vacuum head 122. After the film 150 is lowered onto or substantially close to the support platform 932, the vacuum head 122 releases the film 150 and travels back up into a position for retrieving the next sheet of film 150, as shown in FIG. 11B.

Because the film is at least partially transparent, the opening in the first sidewall 1138a for allowing the vacuum head 122 to pass through should be covered before scanning is performed. A coverage mechanism 1131 is provided for covering the opening after the vacuum head 122 is removed. This coverage mechanism 1131 may comprise, e.g., an opaque shutter for covering the opening. As shown in FIG. 11A, when the vacuum head 122 is positioned at the bottom of the bay 931, the shutter 1131 is displaced out of the way, thereby exposing one side of the film 150. After the vacuum head 122 releases the film 150 and is moved out of the bay 931, the shutter 1131 returns to provide a light-tight seal of the opening in the first sidewall 1138a, as shown in FIG. 11B. The shutter 1131 may be supported by a suspension mechanism (e.g., a spring-loaded support). As the vacuum head 122 presses down upon the upper edge of the shutter 1131, the vacuum head 122 will overcome the resistance of the spring and the shutter 1131 will be lowered. When the vacuum head 122 raises upwards, the shutter 1131 will be automatically raised into place by the spring-loaded support.

FIGS. 12A-12C are side views of a batch loading system 1200 including a positioning mechanism for ensuring proper positioning of the film, in accordance with other embodiments of the present invention. The transport mechanism for the system 1200 may operate substantially the same as the transport mechanism 920 described above to retrieve the sheet of film from the supply tray 910 and to lower the film 150 into the bay 931. However, in the system 900 described above, the film 150 is supported at a single position in the z-direction by the support platform 932. This may be sufficient if the scanner 960 is capable of scanning the entire portion of the interest in the film in a single step.

In some cases, such as when the film 150 is long or the scanner 960 has a small imaging area, it may be desirable to reposition the film 150 after the film 150 has been released by the vacuum head 122. In FIG. 12A, the film 150 is lowered by the vacuum head 122 into the bay 931 (not shown). A sensor 916 may be provided for detecting when the leading edge of the film 150 has entered the bay 931. At this point, the film 150 is released and allowed to drop onto the support platform 932, as shown in FIG. 12B. In some embodiments, side guides 1233 may be provided on the support platform 932 for positioning the end of the film 150 in the y-direction. These side guides 1233 may be separated during loading of the film 150, and then brought together to securely position the end of the film 150 therebetween.

A roller 1232 having a plurality of sprockets 1234 is provided for repositioning the film 150 after deposit into the bay 931. In order to align a sprocket hole 152 in the film 150 with a sprocket 1234 on the roller 1232, the support platform 931 may move up and/or down to reposition the film 150 until the sensor 916 detects a sprocket hole 152. Because the distance between the sensor 916 and the roller 1232 is known and the spacing of the sprocket holes 152 on the film 150 is known, the detection of the sprocket hole 152 by the sensor 916 enables the sprocket 1234 to be accurately mated with a sprocket hole 152.

A counterpressure roller 1270 is provided opposite the roller 1232 to facilitate a secure engagement between the sprockets 1234 and the sprocket holes 152. After the film 150 is positioned in the appropriate vertical location using the sensor 916, the roller 1232 and counterpressure roller 1270 are brought together with the film 150 disposed therebetween, as shown in FIG. 12C. This can be accomplished by moving the counterpressure roller 1270 towards the roller 1232, moving the roller 1232 towards the counterpressure roller 1270 or moving both towards each other. The support platform 932 may be moved out of the way to allow clearance for the film 150 to be translated vertically by the rollers 1232, 1270 so as the position the film 150 for scanning.

FIGS. 13A-13C illustrate another embodiment in which the support platform 932 is omitted. In this embodiment, the vacuum head 122 is used in conjunction with the sensor 916 to position a sprocket hole 152 for mating with a sprocket 1234 of the roller 1232. The operation of the system is otherwise the same as in FIGS. 12A-12C. Sidewalls may also be provided to avoid movement of the film 150 in the y-direction.

Figure 14C:
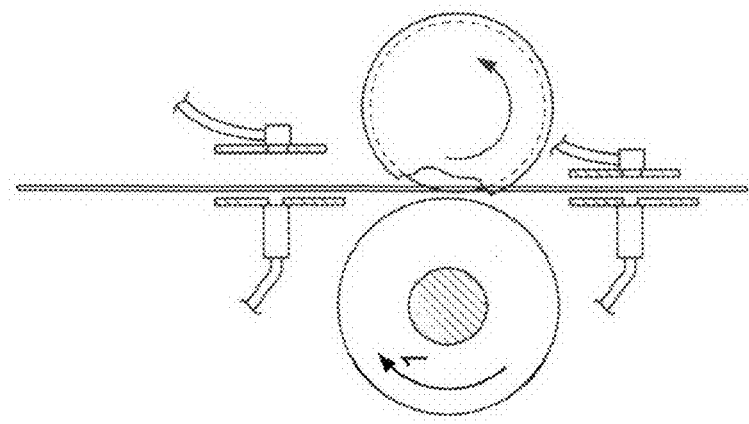
FIGS. 14A-14C are side views of a batch loading system in accordance with another embodiment of the present invention.
Figure 14B:
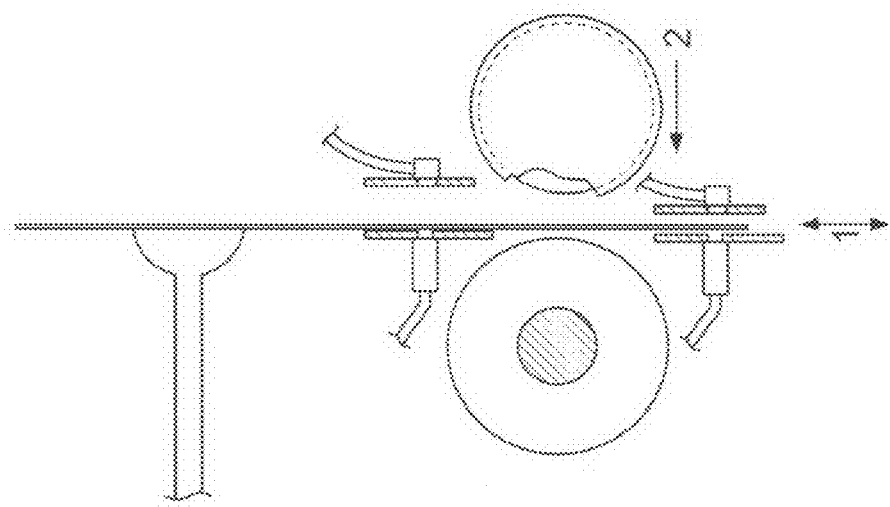
Figure 14A:
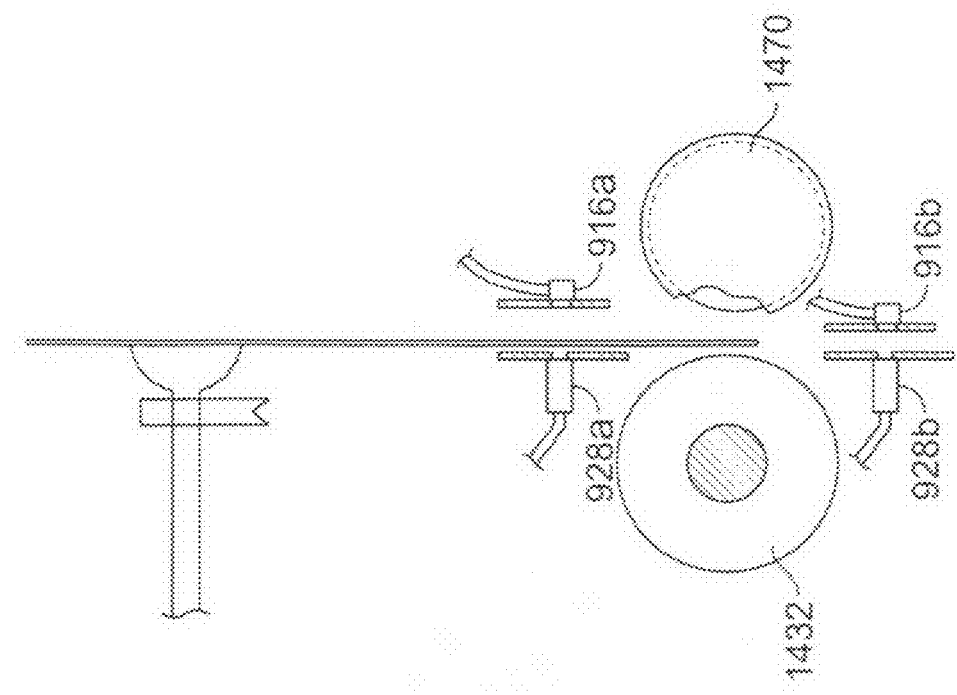

FIGS. 14A-14C illustrate another embodiment in which the roller 1232 from FIGS. 12A-12C is replaced with a roller 1432 which is not provided with any sprockets. In this embodiment, the film 150 is compressed between the smooth-surfaced roller 1432 and counterpressure roller 1470 and is securely retained therebetween by static friction. In addition, a second sensor 916b positioned below the rollers 1432, 1470 to provide additional guidance for positioning the film 150. Sidewalls may also be provided to avoid movement of the film 150 in the y-direction.

In some embodiments, the supply tray 110 may be movably mounted so as to vary the distance between the film receiver assembly 130 and the support 111. When the supply tray 110 supports only a few sheets of film 150, the support 111 may be positioned very close to the film receiver assembly 130, and when the supply tray 110 is filled with many sheets of film 150, the support 111 may be positioned farther from the film receiver assembly 130. As a result, the vacuum head 122 need not travel far in the vertical direction in order to make contact with the top sheet of film 150, regardless of the size of the stack of film. This can help increase the loading speed and enable the use of much larger stacks of film without requiring an extremely long range of vertical motion for the vacuum head 122.

In some embodiments, if the movable supply tray 110 is used in conjunction with one or more guide posts 112, it may be desirable for guide posts 112 to remain fixed relative to the film receiver assembly 130 so as to maintain the alignment between the distal ends 113 of the guide posts 112 and the sprockets 134 in the roller 132. Thus, the support 111 may be configured to move relative to the guide posts 112. This can be achieved by fixing the position of the guide posts 112 and forming holes in the support 111 through which the guide posts 112 are received, thereby enabling the support 111 to travel up and down the guide posts 112.

Figure 18D:
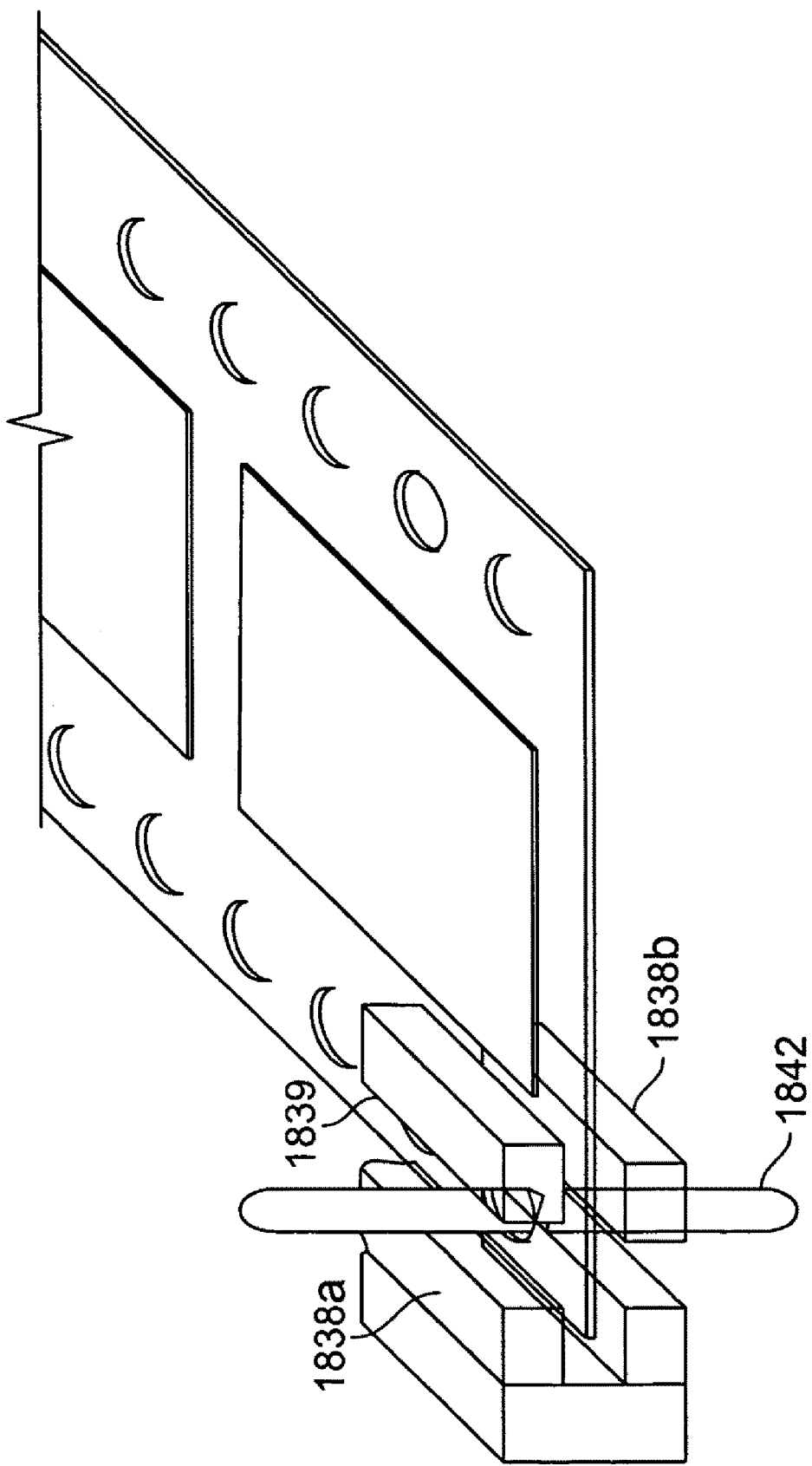
FIG. 18D shows a partial cutaway perspective view of a pin received within the slots of the upper and lower guides.

In accordance with other embodiments of the present, various types of flattening mechanisms may also be used. For example, FIGS. 18A-18C are perspective views of another film receiver assembly 1830, including a flattening mechanism 1860 and a feed mechanism 1840. In this embodiment, the feed mechanism 1840 comprises a pair of pins 1842 mounted on a pair of beams 1844, respectively. The flattening mechanism 1860 comprises a pair of upper guides 1838a and a pair of lower guides 1838b. The upper and lower guides 1838a-1838b may having a decreasing separation distance, similar to upper and lower guides 138a-138b, described above with respect to FIG. 1B. Each of the upper guides 1838a includes a slot 1839 in which one of the beams 1844 is received. These slots 1839 enable the beams 1844 to be moved up and down in the z-direction. FIG. 18D shows a partial cutaway view of a pin 1842 received within the slots 1839 of the upper and lower guides 1838a-1838b.

In operation, the sheet of film 150 may be raised by the vacuum head 122 to approximately the level of the transport path for the film receiver assembly 1830. The vacuum head 133 may then position the sprocket holes in the film 150 to align with the pins 1842, the beams 1844 may be moved to position the pins 1842 to align with the sprocket holes in the film 150, or both. The optical sensors 816 described above may be used to control the relative positioning of the pins 1842 and the sprocket holes. Once the pins 1842 and the sprocket holes are aligned, the beams 1844 may be moved downward in the z-direction so as to mate the pins 1842 with the sprocket holes, as shown in FIG. 18B. Once mated, the beams 1844 may be moved forward in the y-direction to draw the film along the transport path, as shown in FIG. 18C. The vacuum head 122 may maintain the suction with the film 150 until the film 150 is securely within the upper and lower guides 1838a-1838b.

FIGS. 19A-19B illustrate another embodiment of the present invention in which another flattening mechanism may be used in conjunction with a film receiver assembly 630 utilizing a pair of upper rollers 632 having a belt 638 passed therebetween, as described above with respect to FIGS. 6A-6C. FIG. 19A is a perspective cutaway view of the flattening mechanism and FIG. 19B is a front view of the flattening mechanism. In this embodiment, the belt 638 provides the flattening force onto the upper surface of the film 150, and a pair of lower guides 1938 provide the flattening force onto the lower surface of the film 150. The lower guides 1938 include slots 1939 to enable the sprockets 634 on the belt 638 to pass through the lower guides 1938. This ensures a secure fit, while avoiding contact between the image portion of the film and the guides 1938 and belt 638.

Embodiments of the present invention may provide various advantages not provided by prior art systems. Batch loading and scanning of photo negatives can be reliably provided with minimal operator interaction, even when the photo negatives are of different sizes and have imperfections, such as bends or warping. Damage to the photo negatives may be avoided because the position of the film is always mechanism ensured. In contrast, in conventional systems which use rollers or belts, the film may expectedly shift out of place during processing. In addition, large volumes of film can be loaded into the supply tray for processing.

While the invention has been described in terms of particular embodiments and illustrative figures, those of ordinary skill in the art will recognize that the invention is not limited to the embodiments or figures described. For example, in the various embodiments described above, different types of guidance and loading mechanisms are described. It will be understood that these mechanisms may be used in different combinations than those described. For example, different numbers of guide posts 112 may be used. In some embodiments, none are used, in other embodiments, one, two, or more may be used in order to provide the desired degree of guidance.

In many of the embodiments described above, the scanning assembly, the film receiver assembly, transport mechanism, and supply tray are provided as part of a single system. In other embodiments, the supply tray and transport mechanism may be provided for loading film into a separate scanning device. The integration of the loading system with a third party scanner may include software integration of both the measurement and control mechanisms, sensor measurement of the third party scanner status, including tooth position.

In addition, the various embodiments described above relate to film handling systems for use with 135 format film. In other embodiments, the film handling systems may be used with various types of film formats, such as 110, 120, and APS format film may be used. Each of these different types of film formats may have different film dimensions, image sizes, and sprocket hole arrangements (such as APS film, which is provided with sprocket holes along only a single edge). The film handling systems may be designed to handle various types of film or other products. Accordingly, the spacing of sprocket wheels from each other and/or the spacing of sprockets on the sprocket wheels may be adjustable to allow the film loading system to accommodate different types of film.

Other embodiments of the present invention may be used for handling other types of media. For example, some embodiments may be used for handling media having a regular and continuous distribution of sprocket holes along one or two edges of the media. Other embodiments may be used for handling media having a single sprocket hole in a defined position. Yet other embodiments may be used for handling photos, mounted slides, business cards and other media.

Figure 15A:
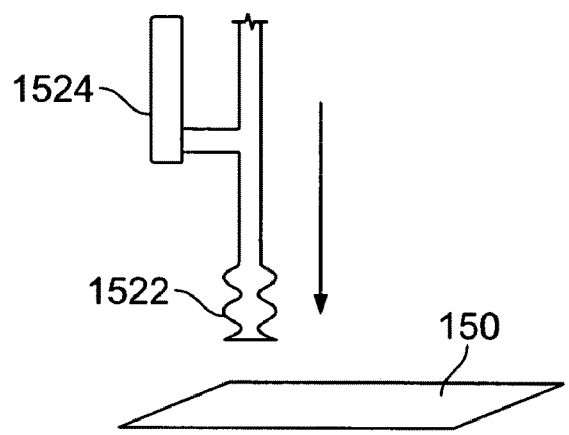
FIGS. 15A-15C are side views of a vacuum head in accordance with another embodiment of the present invention.
Figure 15C:
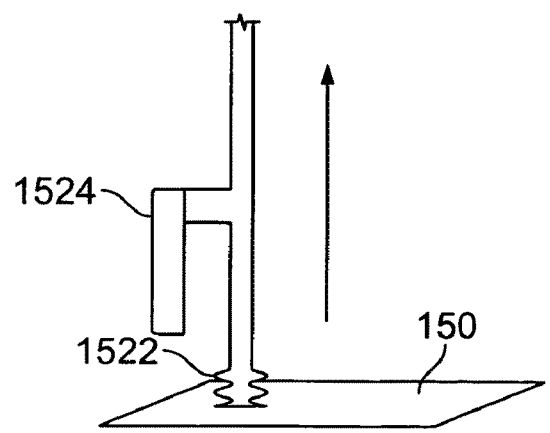

FIGS. 15A-15C are side views of a vacuum head in accordance with another embodiment of the present invention. Instead of the vacuum head 122 and vacuum source 123 shown in FIG. 1, an alternative vacuum head 1522 could be used. This vacuum head 1522 may comprise a flexible bellows which is shown in its default expanded state in FIG. 15A. The bellows forms an air chamber that is compressed when the head 1522 is pressed against the film 150, as shown in FIG. 15B. An electrically controllable valve 1524 closes such that the natural expansion of the bellows as the head 1522 is lifted creates a vacuum in the bellows. This vacuum can retain the film 150 against the head 1522. In order to release the film 150, the valve 1524 opens, thereby allowing air to enter the bellows and releasing the film 150.

In some embodiments, the film handling system may be used with a scanner having its own sprocket wheel. In this case, a special film strip having two oversized perforations may be used to detect the position of the sprockets on the scanner's sprocket wheel. When the film strip is fed into the scanner and the scanner's sprocket wheel engages the oversized perforations, the teeth in the scanner's sprocket wheel will pass through the oversized perforations, thereby preventing the scanner's sprocket wheel from engaging the film. Thus, the position of the scanner's sprocket wheel can be accurately determined. The position of the sprocket wheel in the film handling assembly may then be adjusted to accommodate the geometrical requirements of the film being loaded.

In addition, in various embodiments described above, optical sensors are used for detecting the position of the film. In other embodiment, other types of sensors may be used.

In addition, in some embodiments described above, two-sided scanners are used having a light source provided on one side of the film and an image detector provided on the other side. In other embodiments, different types of scanners may be used, such as single-sided scanners having a light source and image detector on the same side.

In some embodiments described above, the vacuum head is configured to translate the film in a single direction (e.g., the z-direction as shown in FIG. 1A). However, in other embodiments, the vacuum head may be configured to translate the film in two or more directions. For example, the vacuum head may translate the film in the x-direction in order to align the sprockets in the film with the film receiver assembly. Alternatively, the vacuum head may translate the film in the y-direction in order to load the film such that the film is securely received by the corresponding sprockets in the film receiver assembly. In other embodiments, the vacuum head may translate and rotate the film in order to load the film into the film receiver assembly.

In various embodiments described above (e.g., film handling system 100 shown in FIG. 1A), the roller 132 comprises a single roller having two rows of sprockets 134 for mating with the film 150. In other embodiments, the roller may comprise a pair of smaller rollers separated by a gap, with each roller including a single row of sprockets for mating with one edge of the film. This arrangement will enable the vacuum head to pass through the gap and thereby maintain the suction coupling with the film as the vacuum head travels with the film horizontally in the y-direction.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A film handling system, comprising:
   a supply container for supporting a plurality of sheets of film;
   a film receiving mechanism; and
   a transport mechanism for retrieving a sheet of film from the supply container and transporting the sheet of film to the film receiving mechanism, said transport mechanism comprising a vacuum head for adhering the sheet of film to the transport mechanism;
   wherein the film receiving mechanism comprises a feed mechanism for conveying the sheet of film received by the film receiving mechanism, said feed mechanism comprising at least one pin for mating with at least one of a plurality of sprocket holes in the sheet of film transported by the transport mechanism; and
   said supply container further comprises at least one elongated film guide having a first end for insertion into one of the sprocket holes in the sheet of film in said supply container; and
   said pin of the film receiving mechanism is adapted to be adjacent to a distal second end of the film guide as the transport mechanism transports the sheet of film along said film guide to the receiving mechanism.

2. The system of claim 1, wherein:
   said transport mechanism transports the sheet of film to the film receiving mechanism in a first direction substantially perpendicular to a plane defined by the sheet of film; and
   said feed mechanism conveys the sheet of film received by the film receiver in a second direction substantially perpendicular to the first direction.

3. The system of claim 1, wherein:
   said feed mechanism comprises a mount, said mount comprising said pin for mating with sprocket holes in the sheet of film.

4. The system of claim 1, wherein:
   said feed mechanism comprises a beam, said beam comprising said pin for mating with sprocket holes in the sheet of film.

5. The system of claim 1, wherein:
   said feed mechanism comprises a belt, said belt comprising said pin for mating with sprocket holes in the sheet of film.

6. The system of claim 1, further comprising:
   a roller for pressing the sheet of film against the feed mechanism.

7. The system of claim 1, wherein:
   said feed mechanism comprises a lever, said lever comprising said pin.

8. The system of claim 1, further comprising:
   a clamping member for clamping the sheet of film against the feed mechanism.

9. The system of claim 1, further comprising:
   a flattening mechanism for guiding said pin.

10. The system of claim 1, further comprising:
    a flattening mechanism for providing a flattening force onto the sheet of film. a clamping member for clamping the sheet of film against the feed mechanism.

* * * * *